(12) United States Patent
Swartz

(10) Patent No.: US 7,522,221 B2
(45) Date of Patent: *Apr. 21, 2009

(54) INTERLACED VIDEO FIELD MOTION DETECTION

(75) Inventor: Peter D. Swartz, San Jose, CA (US)

(73) Assignee: Genesis Microchip Inc., Santa Clara, CA (US)

( * ) Notice: Subject to any disclaimer, the term of this patent is extended or adjusted under 35 U.S.C. 154(b) by 753 days.

This patent is subject to a terminal disclaimer.

(21) Appl. No.: 10/999,395

(22) Filed: Nov. 29, 2004

(65) Prior Publication Data

US 2005/0078215 A1      Apr. 14, 2005

Related U.S. Application Data

(62) Division of application No. 10/388,686, filed on Mar. 14, 2003, now Pat. No. 6,859,237, which is a division of application No. 09/780,057, filed on Feb. 9, 2001, now Pat. No. 6,580,463, which is a division of application No. 09/440,678, filed on Nov. 16, 1999, now Pat. No. 6,201,577, which is a division of application No. 08/948,841, filed on Oct. 10, 1997, now Pat. No. 6,014,182.

(51) Int. Cl.
    *H04N 5/14* (2006.01)
(52) U.S. Cl. ..................................... 348/700
(58) Field of Classification Search ............. 348/452, 348/448, 700, 458, 451, 558, 447, 459; 375/240.16, 375/240.17; *H04N 5/14*
    See application file for complete search history.

(56) References Cited

U.S. PATENT DOCUMENTS 3,832,487 A      8/1974   Niet
4,272,787 A      6/1981   Michael et al.
4,298,888 A     11/1981   Colles et al.
4,322,750 A      3/1982   Lord et al.
4,386,367 A      5/1983   Peterson et al.
4,400,719 A      8/1983   Powers
4,435,728 A      3/1984   Raven et al.
4,531,152 A      7/1985   Lemelson et al.

(Continued)

FOREIGN PATENT DOCUMENTS

JP      06-152794       5/1994

OTHER PUBLICATIONS

System Description Super NTSC, Faroudja Research, Mar. 15, 1990, Section I, II and IV.

(Continued)

*Primary Examiner*—Tung Vo
(74) *Attorney, Agent, or Firm*—Beyer Law Group LLP

(57) ABSTRACT

A television line doubler (interlaced to progressive scan converter) incorporating the following aspects an improved field motion detector which does not treat low frequency vertical transitions as motion; a frame motion detector having an improved ability to differentiate motion from subcarrier signal components; a sawtooth artifact detector; a sawtooth artifact detector in combination with a film pattern detector, such that the artifact detector can take the film pattern detector out of film mode earlier than it would if it only were responsive to a break in the film pattern; tandem field motion detectors; an improved field based film detector; film pattern detectors and motion detectors used therewith which operate by performing end-of-field calculations; the combination of a field motion detector and a frame motion detector such that the frame motion detector provides a motion signal used as a verification by the field motion detector; an improved NTSC film detector requiring a minimum number of NTSC film pattern sequences; and an improved PAL film detector employing a minimum motion threshold detector.

12 Claims, 13 Drawing Sheets

U.S. PATENT DOCUMENTS

| | | | |
|---|---|---|---|
| 4,551,753 A | 11/1985 | Nishizawa et al. | |
| 4,620,225 A | 10/1986 | Wendland et al. | |
| 4,635,114 A | 1/1987 | Wendland et al. | |
| 4,641,188 A | 2/1987 | Dischert | |
| 4,651,211 A | 3/1987 | Weckenbrock et al. | |
| 4,652,909 A | 3/1987 | Glenn | |
| 4,661,850 A | 4/1987 | Strolle et al. | |
| 4,692,801 A | 9/1987 | Ninomiya et al. | |
| 4,698,675 A | 10/1987 | Casey | |
| 4,709,277 A | 11/1987 | Ninomiya et al. | |
| 4,713,688 A | 12/1987 | Guttner | |
| 4,733,299 A | 3/1988 | Glenn | |
| 4,864,398 A | 9/1989 | Avis et al. | |
| 4,897,716 A | 1/1990 | Drewery et al. | |
| 4,924,306 A | 5/1990 | Van der Meer et al. | |
| 4,933,759 A | 6/1990 | Van der Meer et al. | |
| 4,935,816 A | 6/1990 | Faber | |
| 4,937,668 A | 6/1990 | Hosaka | |
| 4,941,045 A | 7/1990 | Birch | |
| 4,959,715 A | 9/1990 | Prodan | |
| 4,967,271 A | 10/1990 | Campbell et al. | |
| 4,979,020 A | 12/1990 | Isnardi | |
| 4,984,077 A * | 1/1991 | Uchida | 348/458 |
| 4,985,767 A | 1/1991 | Haghiri et al. | |
| 4,989,090 A * | 1/1991 | Campbell et al. | 348/451 |
| 4,998,167 A | 3/1991 | Jaqua | |
| 4,998,287 A | 3/1991 | Katznelson et al. | |
| 5,019,904 A | 5/1991 | Campbell | |
| 5,023,713 A | 6/1991 | Nishigori | |
| 5,043,810 A | 8/1991 | Vreeswijk et al. | |
| 5,081,532 A | 1/1992 | Rabii | |
| 5,115,311 A | 5/1992 | Jaqua | |
| 5,128,747 A | 7/1992 | Isnardi et al. | |
| 5,134,480 A | 7/1992 | Wang et al. | |
| 5,136,380 A | 8/1992 | Cho | |
| 5,138,449 A | 8/1992 | Kerpchar | |
| 5,146,329 A | 9/1992 | Flamm | |
| 5,153,719 A | 10/1992 | Ibental | |
| 5,157,490 A | 10/1992 | Kawai et al. | |
| 5,174,641 A | 12/1992 | Lim | |
| 5,177,615 A | 1/1993 | Ozaki et al. | |
| 5,191,413 A | 3/1993 | Edgar | |
| 5,191,427 A | 3/1993 | Richards et al. | |
| 5,204,745 A | 4/1993 | Kawai et al. | |
| 5,221,966 A | 6/1993 | Clayton et al. | |
| 5,227,879 A | 7/1993 | Morita et al. | |
| 5,235,417 A | 8/1993 | Casavant et al. | |
| 5,255,091 A | 10/1993 | Lyon et al. | |
| 5,267,035 A | 11/1993 | Weckenbrock et al. | |
| 5,303,045 A | 4/1994 | Richards et al. | |
| 5,315,327 A | 5/1994 | Suzuki | |
| 5,317,397 A * | 5/1994 | Odaka et al. | 375/240.15 |
| 5,317,398 A | 5/1994 | Casavant et al. | |
| 5,329,317 A | 7/1994 | Naimpally et al. | |
| 5,337,154 A | 8/1994 | Dorricott et al. | |
| 5,355,169 A * | 10/1994 | Richards et al. | 348/459 |
| 5,365,273 A | 11/1994 | Correa et al. | |
| 5,365,280 A | 11/1994 | De Haan et al. | |
| 5,386,237 A | 1/1995 | Knee | |
| 5,398,071 A | 3/1995 | Gove et al. | |
| 5,406,333 A | 4/1995 | Martin | |
| 5,428,399 A | 6/1995 | Robinson et al. | |
| 5,430,488 A | 7/1995 | Hedley | |
| 5,446,497 A | 8/1995 | Keating et al. | |
| 5,452,011 A | 9/1995 | Martin et al. | |
| 5,455,628 A | 10/1995 | Bishop | |
| 5,461,420 A | 10/1995 | Yonemitsu et al. | |
| 5,469,217 A | 11/1995 | Ibental et al. | |
| 5,473,381 A | 12/1995 | Lee | |
| 5,475,435 A | 12/1995 | Yonemitsu et al. | |
| 5,485,216 A | 1/1996 | Lee | |
| 5,485,280 A | 1/1996 | Fujinami et al. | |
| 5,488,419 A * | 1/1996 | Hui et al. | 375/240.17 |
| 5,497,199 A | 3/1996 | Asada et al. | |
| 5,502,489 A | 3/1996 | Kim et al. | |
| 5,508,750 A | 4/1996 | Hewlett et al. | |
| 5,517,247 A | 5/1996 | Correa et al. | |
| 5,517,248 A | 5/1996 | Isoda | |
| 5,534,935 A | 7/1996 | Kawai et al. | |
| 5,550,592 A | 8/1996 | Markandey et al. | |
| 5,563,651 A | 10/1996 | Christopher et al. | |
| 5,563,660 A | 10/1996 | Tsukagoshi | |
| 5,565,998 A | 10/1996 | Coombs et al. | |
| 5,596,371 A | 1/1997 | Pakhchyan et al. | |
| 5,606,373 A | 2/1997 | Dopp et al. | |
| 5,610,662 A | 3/1997 | Hackett | |
| 5,621,470 A | 4/1997 | Sid-Ahmed | |
| 5,625,421 A * | 4/1997 | Faroudja et al. | 348/607 |
| 5,631,706 A | 5/1997 | Tsunashima | |
| 6,014,182 A * | 1/2000 | Swartz | 348/700 |
| 6,201,577 B1 * | 3/2001 | Swartz | 348/558 |
| 6,348,949 B1 * | 2/2002 | McVeigh | 348/452 |
| 6,473,460 B1 * | 10/2002 | Topper | 375/240.16 |
| 6,480,543 B1 * | 11/2002 | Pau et al. | 375/240.16 |
| 6,580,463 B2 * | 6/2003 | Swartz | 348/558 |
| 6,597,402 B1 * | 7/2003 | Butler et al. | 348/447 |
| 6,859,237 B2 * | 2/2005 | Swartz | 348/700 |

OTHER PUBLICATIONS

"A Progress Report on Improved NTSC," Yves C. Faroudja and Joseph Roizen, J. SMPTE, Nov. 1989, pp. 817-822.

"NTSC and Beyond", Yves Charles Faroudja, IEEE Transactions on Consumer Electronics, Feb. 1988, pp. 166-177.

"Improving NTSC to Achieve Near-RGB Performance," Yves Faroudja and Joseph Roizen, J. SMPTE, Aug. 1987, pp. 750-761.

"On Picture Quality of Some Television Signal Processing Techniques," Broder Wendland and Hartmur Schroeder, J. SMPTE, Oct. 1984, pp. 915-922.

"The Television Scanning Process", G.J. Tonge, J. SMPTE, Jul. 1984, pp. 657-666.

"Signal Processing for New HQTV Systems", by Broder Wendland and Hartmut Schroeder, Television Image Quality, 18th Annual SMPTE Television Conference in Montreal, Feb. 10-11, 1984, pp. 336-353.

"Psychophysics and the Improvement of Television Image Quality", by William F. Schreiber, J. SMPTE, Aug. 1984, pp. 717-725.

"Extended-Definition TV Fully Compatible with existing Standards—Proposal and Experimental Results", by Takahiko Fukinuki, et al., Television Image Quality, pp. 354-368.

"Extended Definition Television with High Picture Quality", by Broder Wendland, J. SMOTE, Oct. 1983.

"High Quality Television by Signal Processing" by Broder Wendland, 2nd International Conference on New Systems and Services in Telecommunications, Liege, Belgium, Nov. 1983, pp. 401-409.

"Extended Definition Television with High Picture Quality" by Broder Wendland, Video Pictures of the Future, 17th Annual SMOTE Television Conference in San Francisco, Feb. 4-5, 1983, pp. 57-71.

"High Definition Television Studies on Compatible Basis with Present Standards", by Broder Wendland, Television Technology in the 80's. Feb. 1981, pp. 151-165.

"Temporal Filtering Using Pixel Incrementing" by Harro Bruggemann, J. SMPTE, Aug. 1981, pp. 686-694.

Office Action in corresponding Japanese Application No. 522522/1999 dated Jun. 5, 2007.

* cited by examiner

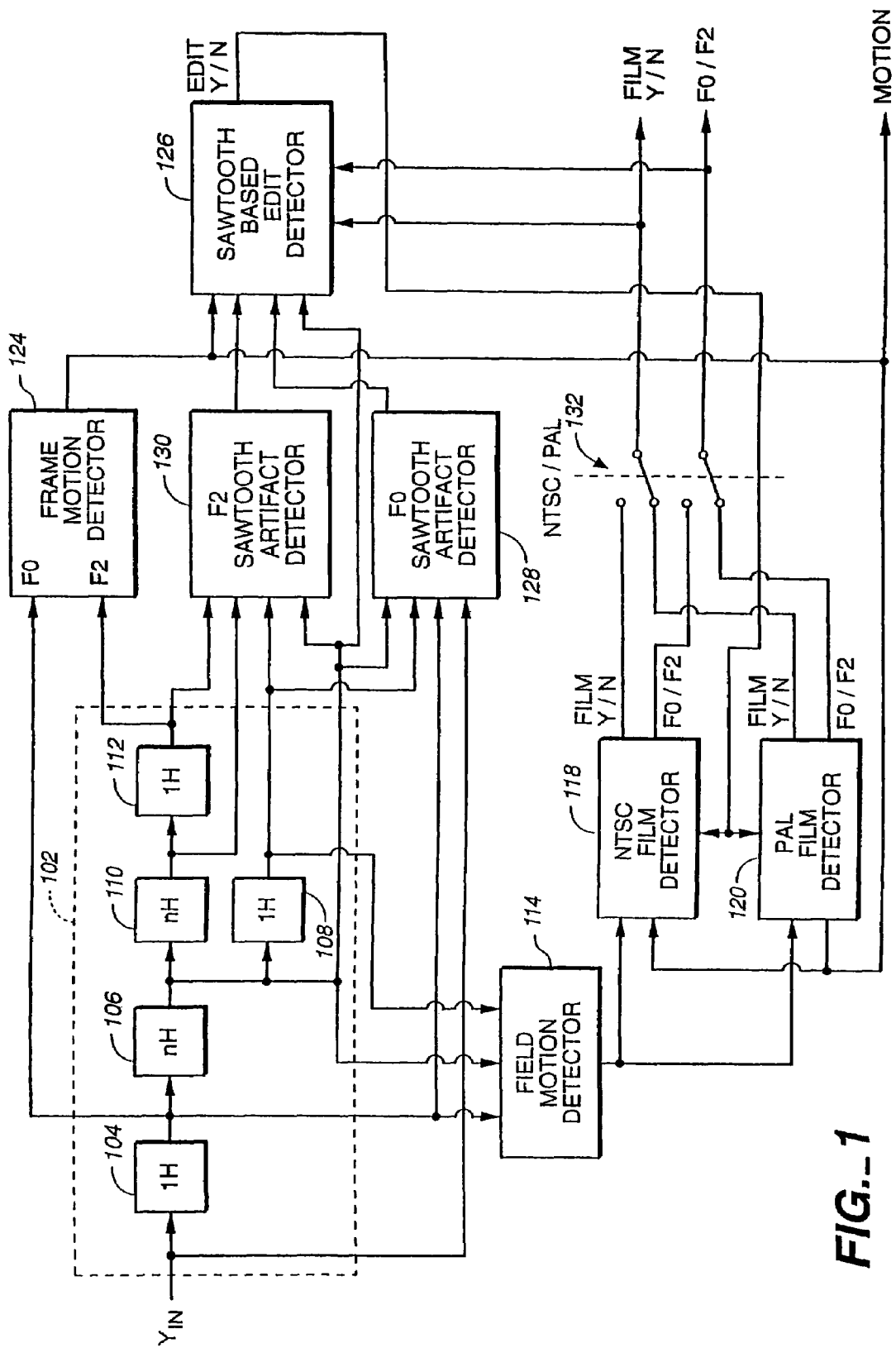
FIG._1

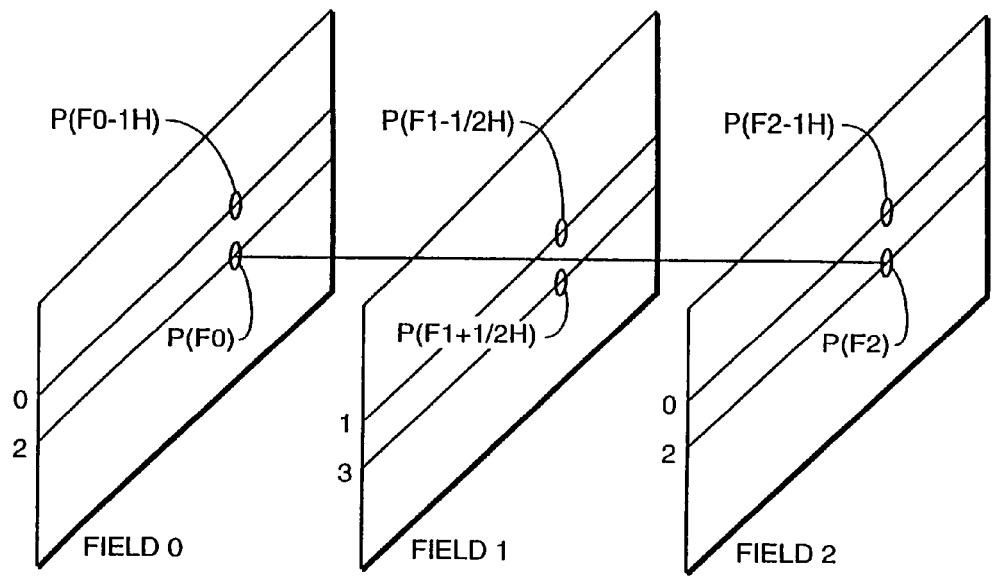
FIG._2
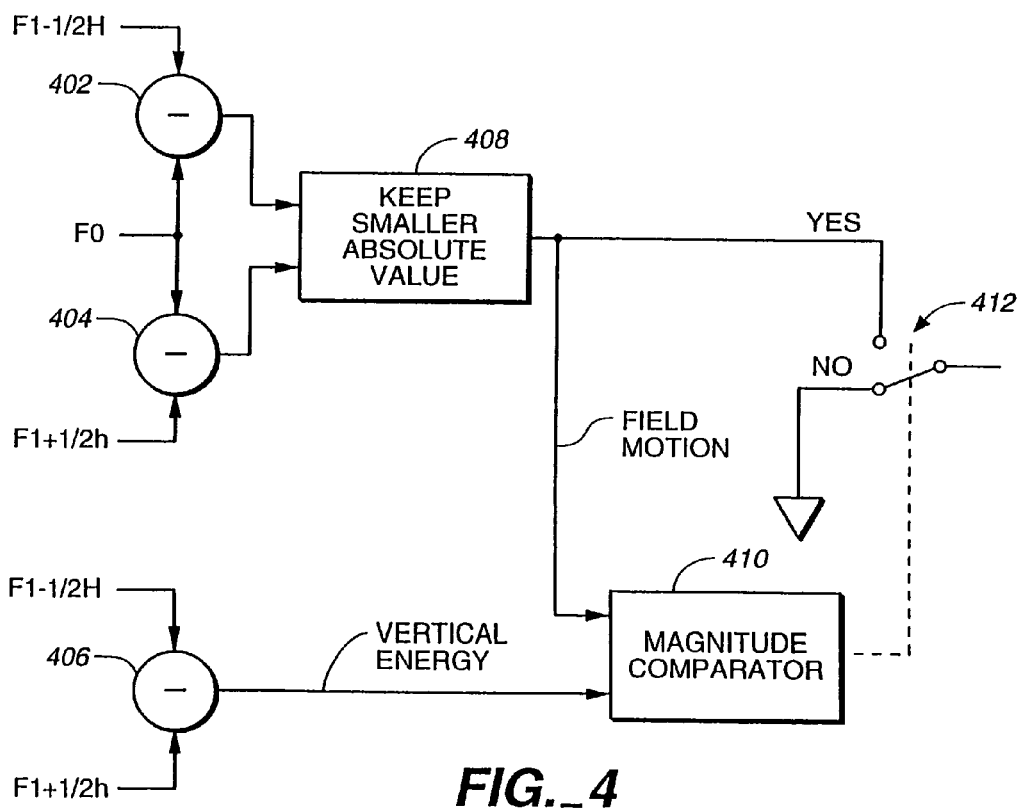
FIG._4

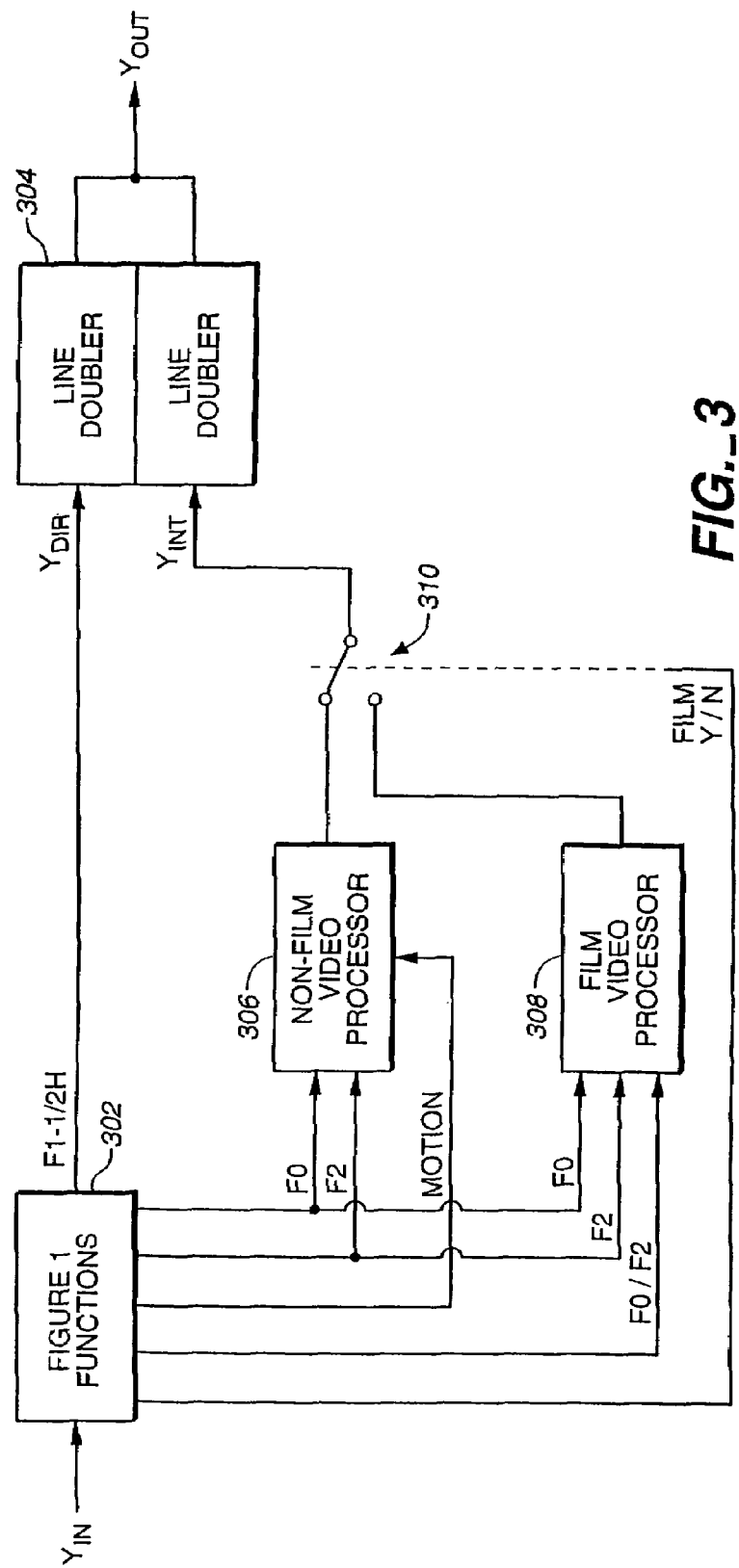
FIG._3

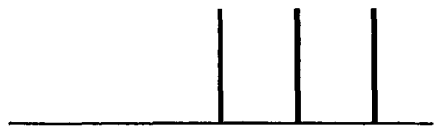
FIG._5A
FIG._6A
FIG._5B
FIG._6B
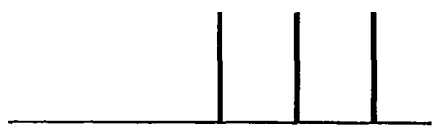
FIG._5C
FIG._6C
FIG._5D
FIG._6D
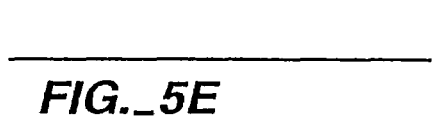
FIG._5E
FIG._6E
FIG._5F
FIG._6F

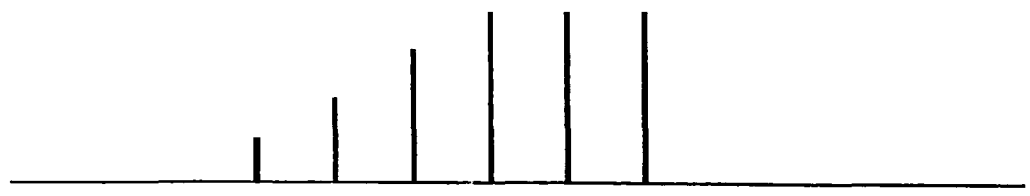
FIG._7A
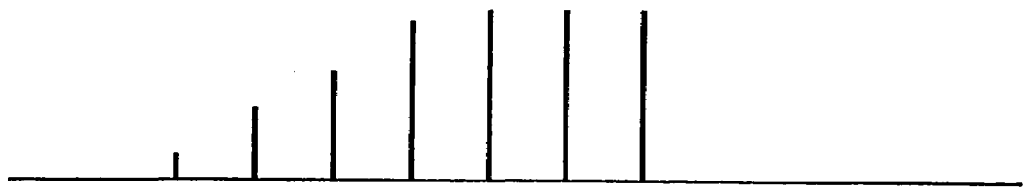
FIG._7B
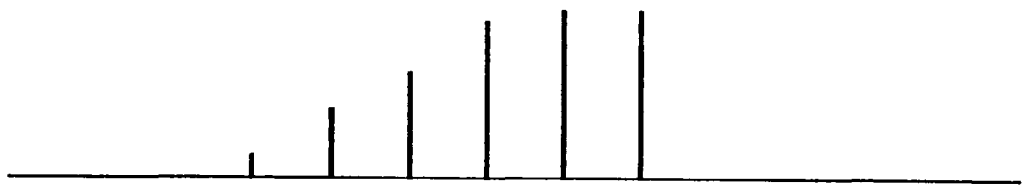
FIG._7C
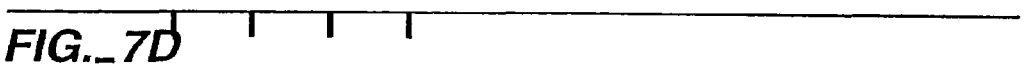
FIG._7D
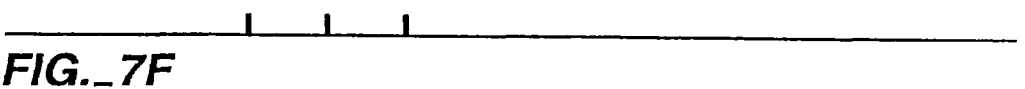
FIG._7E
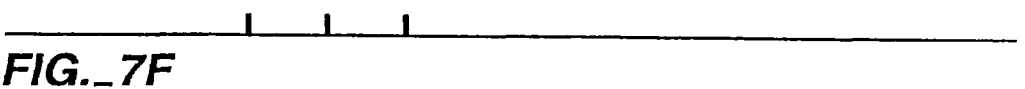
FIG._7F

FIG._8A
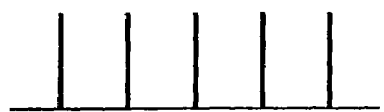
FIG._8B
FIG._8C
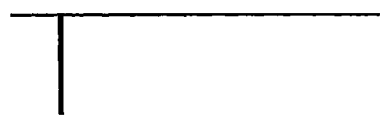
FIG._8D
FIG._8E
FIG._8F
FIG._8G
FIG._8H
FIG._9A
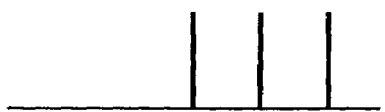
FIG._9B
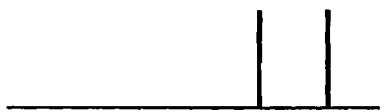
FIG._9C
FIG._9D
FIG._9E
FIG._9F
FIG._9G
FIG._9H

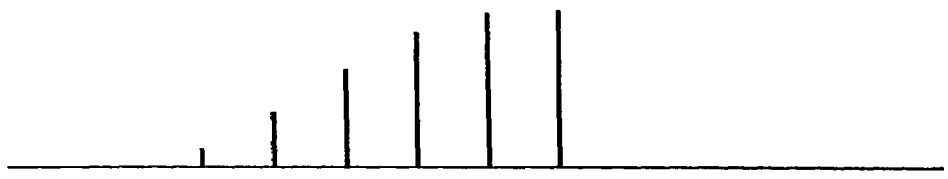
FIG._10A
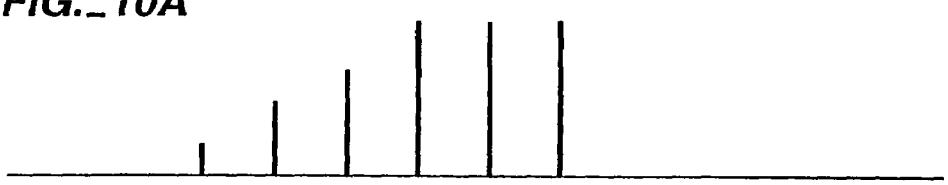
FIG._10B
FIG._10C
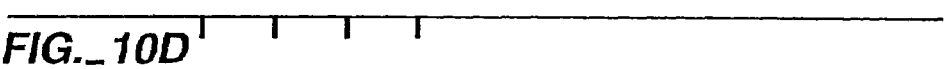
FIG._10D
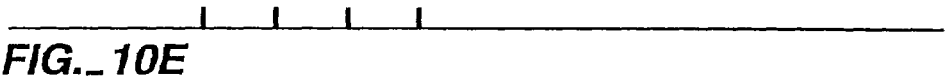
FIG._10E
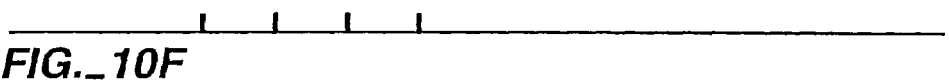
FIG._10F
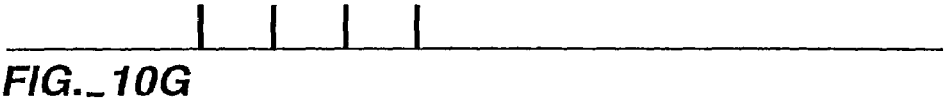
FIG._10G
FIG._10H

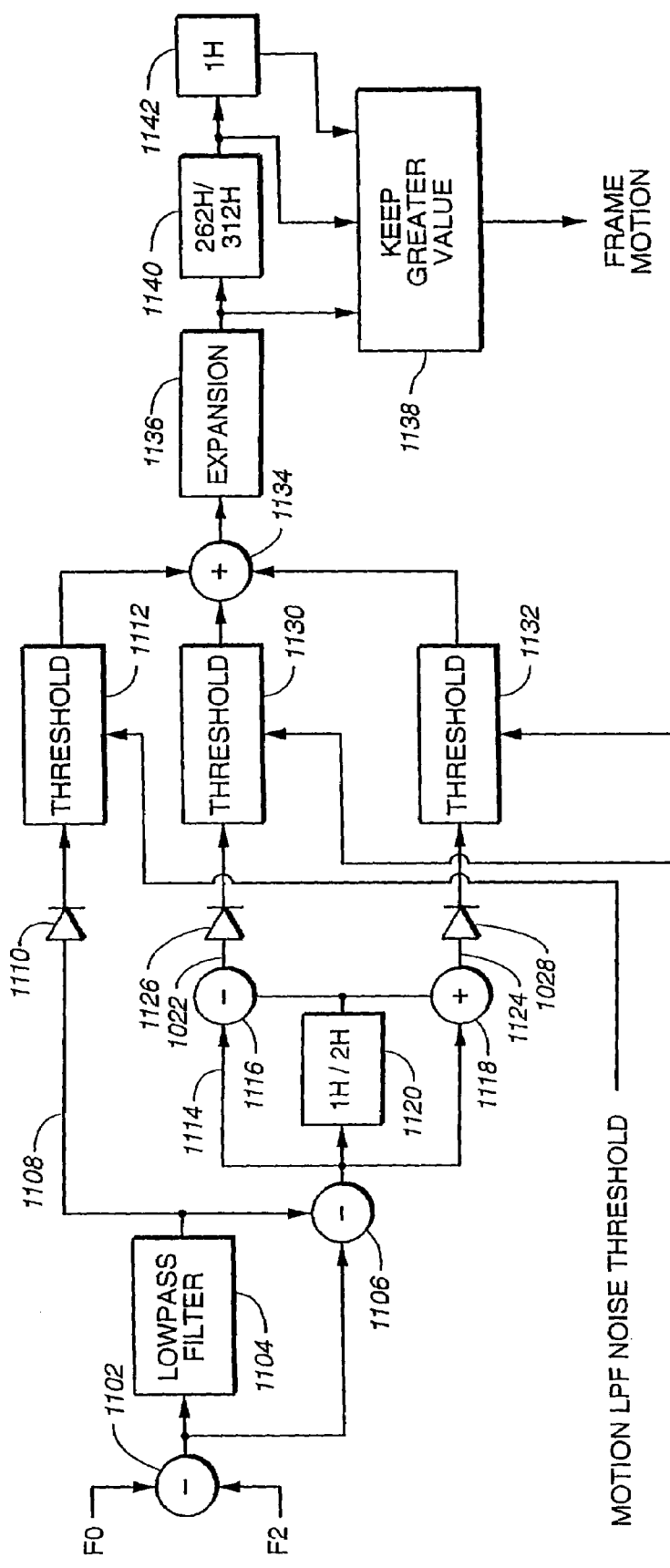
FIG._11

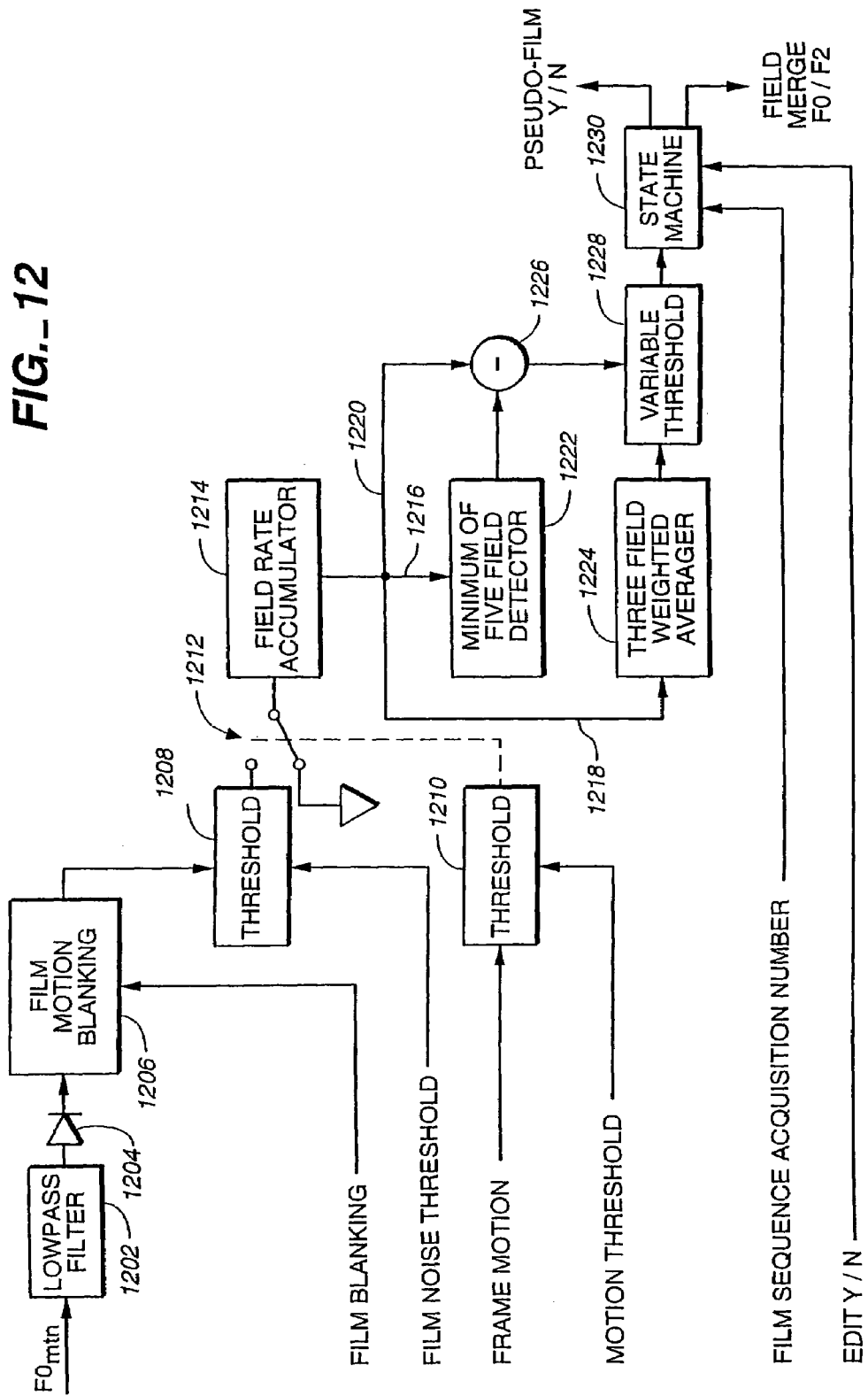
FIG._12

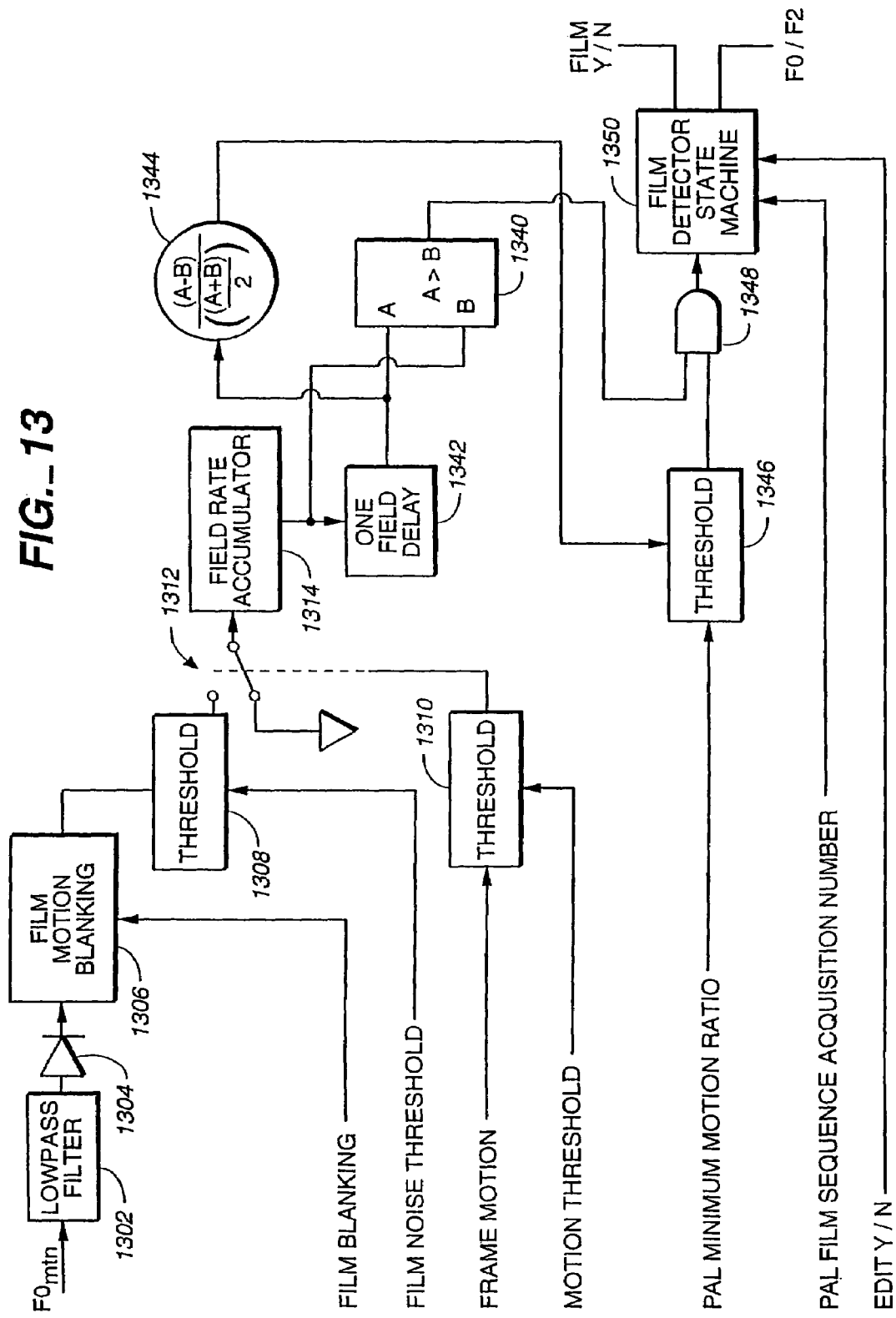
FIG._13

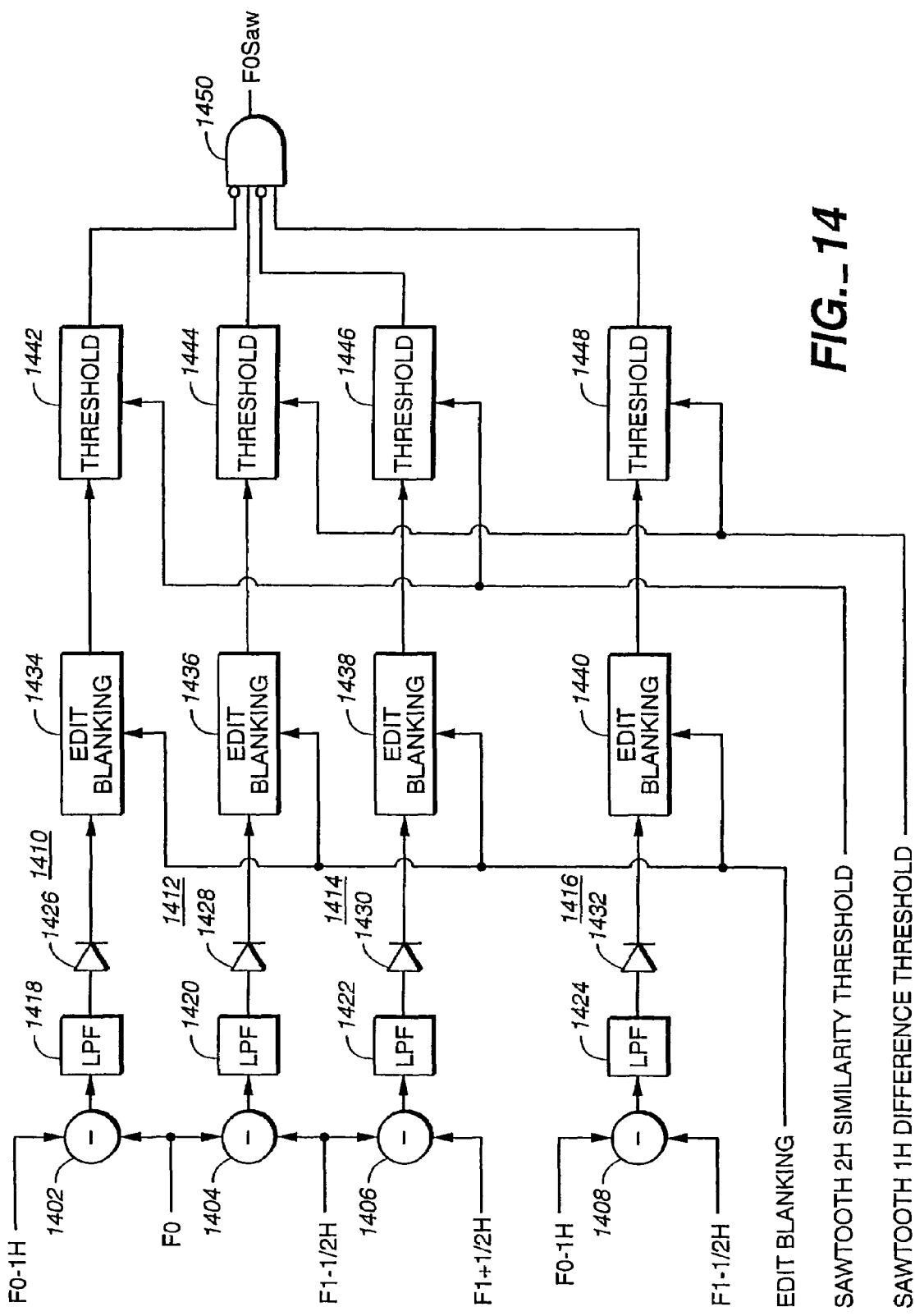
FIG._14

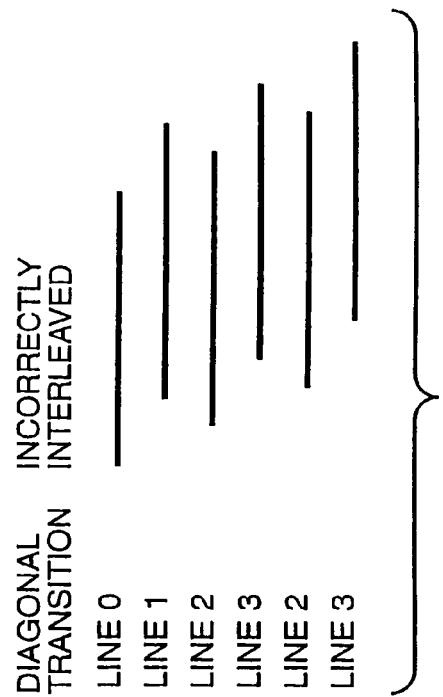
FIG._15B
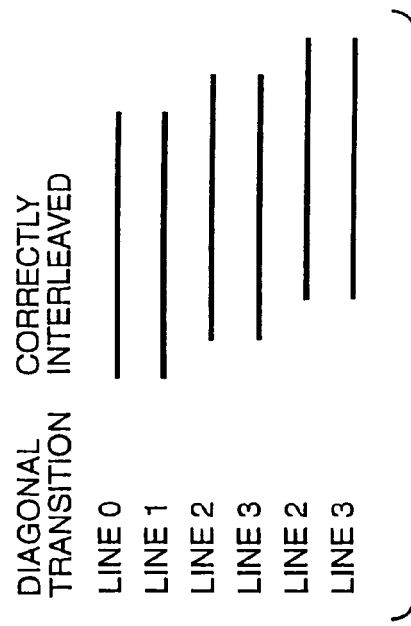
FIG._15D
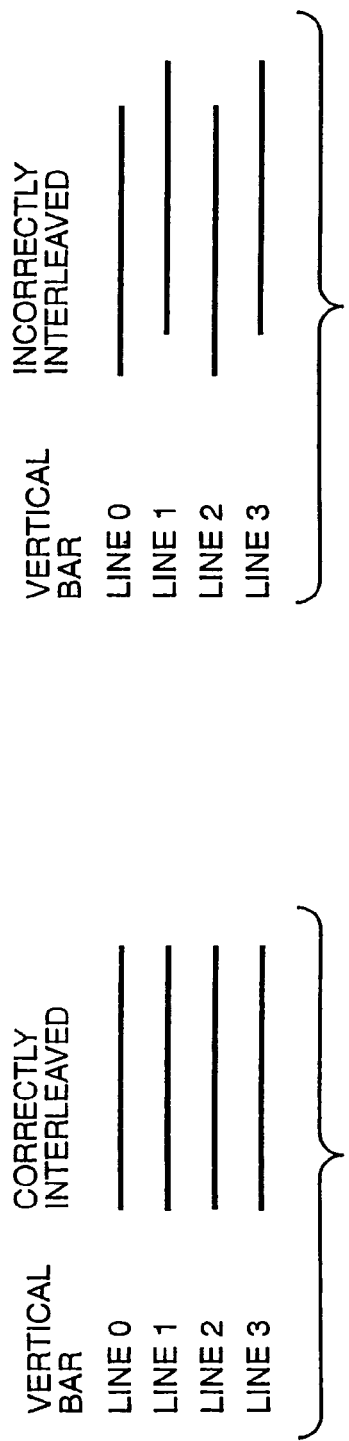
FIG._15A
FIG._15C

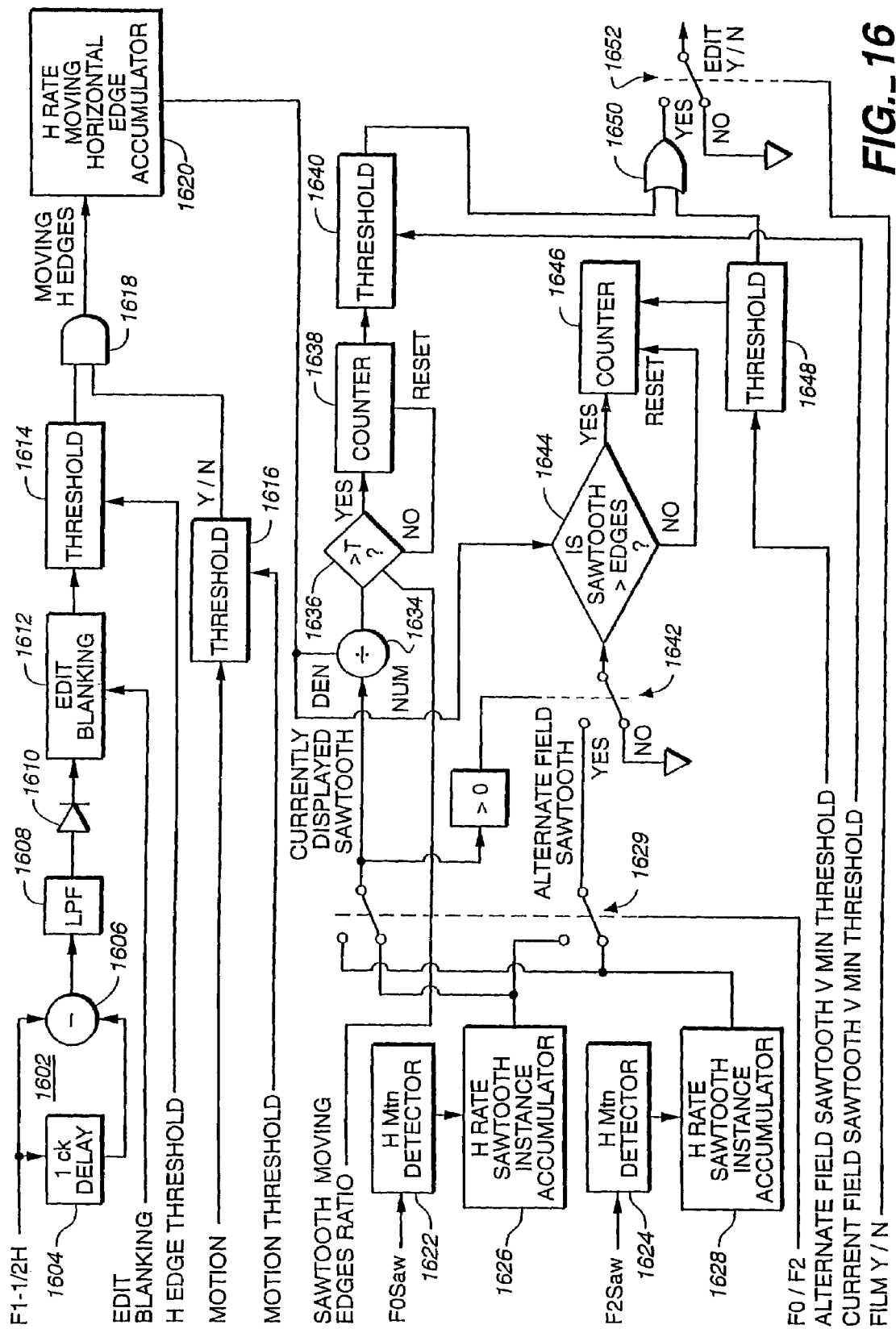
FIG._16

INTERLACED VIDEO FIELD MOTION DETECTION

CROSS REFERENCE TO RELATED APPLICATION

Portions of the present application are common to the copending application of Yves C. Faroudja, Peter D. Swartz and Jack C. Campbell entitled "High-definition Television Signal Processing for Transmitting and Receiving a Television Signal in a Manner Compatible with the Present System," Ser. No. 08/948,539, filed the same day as the present application. This application is also a divisional of U.S. patent application Ser. No. 10/388,686 entitled "Film Source Video Detection" filed Mar. 14, 2003, now U.S. Pat. No. 6,859,237 which is a divisional of Ser. No. 09/780,057 filed Feb. 9, 2001 now U.S. Pat. No. 6,580,463 entitled "Film source video detection" issued Jun. 17, 2003, which is a divisional of Ser. No. 09/440,678 filed Nov. 16, 1999 now U.S. Pat. No. 6,201,577 entitled "Film source video detection", issued Mar. 13, 2001 and is a divisional of Ser. No. 08/948,841 filed Oct. 10, 1997 now U.S. Pat. No. 6,014,182 entitled "Film source video detection", issued Jan. 11, 2000 which are hereby incorporated by reference.

FIELD OF THE INVENTION

The present invention relates to television signal processing. More particularly, the present invention relates to improved signal processing apparatus and methods for detecting motion picture film sources in television signals.

DESCRIPTION OF RELATED ART

In accordance with U.S. Pat. No. 4,876,976, it is known to detect that a 60 Hz NTSC television signal has as its source a 24 frame/second motion picture film. A 24 frame/second film is applied to and synchronized with 60 Hz NTSC video by using a 3-2 film pull-down ratio such that three video fields come from one film frame and the subsequent two video fields come from the next film frame (e.g., AABBBCCDDDEE, etc., where "A," "B," etc. are successive film frames). Video fields of the same parity in adjacent video frames are compared. When motion is present, a distinctive repeating pattern is obtained only if the video source is film (i.e., 1101111011, etc., where "1" indicates motion and "0" indicates no motion).

U.S. Pat. No. 4,982,280 discloses an arrangement for detecting a 30 Hz progressive scan source, which may be a video camera or film, in a 60 Hz progressively scanned non-interlaced television system. In the presence of motion from frame-to-frame within the 30 Hz progressively scanned video image sequences, when the video sequences in adjacent video fields are compared a 010101, etc. pattern results, indicating a 30 Hz progressively scanned source. Comparison of every second video field, to yield a 111111, etc., pattern, further confirms the 30 Hz progressive scan source. In order to operate, the arrangement relies on the spatial coincidence of pixels in the successive identical pairs of fields of the progressive scan television signal.

Published International Patent Application WO 91/30006 discloses apparatus for detecting twenty-five frame per second motion picture film sources in 50 Hz television signals, such as PAL, SECAM, 50 Hz NTSC, 50 Hz HDTV and 50 Hz monochrome television signals. The detection scheme looks for differences in motion between a field and the previous field, on one hand, and between the same field and the subsequent field, on the other hand.

The detection of motion picture film sources in television s is useful in various environments, for example, a line doubler, a television standards converter, a television slow motion processor and a video information compressor.

A well-known "line-doubling" technique employs the conversion of an interlaced television signal (such as employed in the NTSC, PAL and SECAM systems), in which two time consecutive interleaved fields of scan lines represent a frame, to a non-interlaced or progressively scanned television signal, in which all of the scan lines in the frame are scanned out sequentially. The result, in the case of NTSC, is that 525 scan lines are presented every one-sixtieth of a second rather than 262.5 scan lines, thus potentially doubling the vertical resolution to the full frame resolution of 525 lines. Typically, line doublers employ, at least part of the time, field merging or inter-field interpolation, which provides a full doubling of the vertical resolution. Pairs of fields are combined to form a single progressively scanned frame. Such arrangements are described in U.S. Pat. Nos. 4,876,956; 4,967,271; 4,982,280; 4,989,090, 5,159,451 and 5,291,280 detector, such that the artifact detector can take the film pattern detector out of film mode earlier than it would if it only were responsive to a break in the film pattern; tandem field motion detectors; an improved field based film detector; film pattern detectors and motion detectors used therewith which operate by performing end-of-field calculations; the combination of a field motion detector and a frame motion detector such that the frame motion detector provides a motion signal used as a verification by the field motion detector; an improved NTSC film detector requiring a minimum number of NTSC film pattern sequences; an improved PAL film detector employing a minimum motion threshold detector; combinations of these various aspects; and a line doubler (interlaced to progressive scan converter) incorporating one or more of these various aspects.

BRIEF DESCRIPTION OF THE DRAWINGS

FIG. 1 is a functional block diagram showing an overall view of the present invention, including its various aspects.

FIG. 2 is a quasi-three-dimensional representation of three consecutive interlacedscan television fields, showing relative pixel locations within the respective fields.

FIG. 3 is a functional block diagram showing an interlace to line doubled progressive scan converter environment in which the present invention or aspects thereof may be employed.

FIG. 4 is a functional block diagram showing details of the field motion detector of FIG. 1.

FIGS. 5A-F are a series of idealized diagrams showing pixel amplitudes in video streams for the case of a prior art field motion detector having a high-frequency (sharp) vertical transition with no motion.

FIGS. 6A-F are a series of idealized diagrams showing pixel amplitudes in video streams for the case of a prior art field motion detector having a high-frequency (sharp) vertical transition with motion.

FIGS. 7A-F are a series of idealized diagrams showing pixel amplitudes in video streams for the case of a prior art field motion detector having a low-frequency (broad) vertical transition with no motion.

FIGS. 8A-H are a series of idealized diagrams showing pixel amplitudes in video streams for the case of a field motion detector according to an aspect of the present invention having a high-frequency (sharp) vertical transition with no motion.

FIGS. 9A-H are a series of idealized diagrams showing pixel amplitudes in video streams for the case of a field motion detector according to an aspect of the present invention having a high-frequency (sharp) vertical transition with motion.

FIGS. 10A-H are a series of idealized diagrams showing pixel amplitudes in video streams for the case of a field motion detector according to an aspect of the present invention having a low-frequency (broad) vertical transition with no motion.

FIG. 11 is a functional block diagram showing details of the frame motion detector of FIG. 1.

FIG. 12 is a functional block diagram showing details of the NTSC film detector of FIG. 1.

FIG. 13 is a functional block diagram showing details of the PAL film detector of FIG. 1.

FIG. 14 is a functional block diagram showing details of the sawtooth detectors of FIG. 1.

FIG. 15A-D are idealized representations of correctly and incorrectly interleaved scan lines, the incorrectly interleaved scan lines displaying the sawtooth artifact.

FIG. 16 is a functional block diagram showing details of the sawtooth based edit detector of FIG. 1.

INCORPORATION BY REFERENCE

Each of the following United States patents, mentioned in the present application, are hereby incorporated by reference in their entirety: U.S. Pat. Nos. 4,876,596; 4,967,271; 4,982,280; 4,989,090; 5,159,451; 5,291,280; 5,488,422; and 5,625,421.

DETAILED DESCRIPTION OF THE PREFERRED EMBODIMENTS

Except as noted herein, practical embodiments of the invention may be implemented using analog, digital (including digital signal processing with software), or hybrid analog/digital techniques. The equivalency of analog and digital implementations in most contexts is well known to those of ordinary skill in the art.

Throughout this document, for simplicity, signal inputs and outputs are drawn as single points and signal carrying lines are drawn as single lines. It will be understood that, in practice, more than one input or output point and more than one signal carrying line may be required, depending on the format of the signals and the manner in which the practical embodiments of the invention are physically constructed.

It should also be understood that functions shown separately may be combined with others in whole or in part. In addition, those of ordinary skill in the art will understand that, in practice, switches shown throughout the various figures will be implemented electronically or in software rather than mechanically.

The invention or aspects of the invention may be advantageously employed in connection with an interlace to line doubled progressive scan converter which, for example, precedes a video data compressor or a standards converter. Both video compression and standards conversion are more accurately and easily accomplished when operating on a progressively scanned television signal rather than an interlaced television signal. By employing the present invention in a progressive scan converter preceding such video compression or standards conversion, such processes are assured to be operating on a more optimum signal source.

An overall view of the present invention, including its various aspects is shown in FIG. 1. FIG. 3, described below, shows an interlace to line doubled progressive scan converter environment in which the present invention or aspects thereof may be employed.

Referring now to FIG. 1, a signal $Y_{in}$ is applied to an array of field and line memories 102. The signal $Y_i$ may be a monochrome video signal or the luminance components of a component color video signal. Those of ordinary skill in the art will understand that a component video signal may comprise analog or digital components such as RGB (from which luminance and chrominance components may be derived), Y/I/Q, Y/U/V, Y/R-Y/B-Y, Y/Cr/Cb, etc. Furthermore, in the case of digital components, the received digital component video signal may be in any of a number of compressed or uncompressed formats, including, for example, various ones of the digital component video formats in accordance with the recommendations, standards or compression algorithms of the CCIR (International Radio Consultative Committee) (such as the hierarchy of digital video coding formats under CCIR Recommendation 601, the 4:2:2 format often being referred to as a CCIR 601 video signal), ISO/MPEG (the Motion Picture Experts Group of the International Standards Organization), SMPTE (Society of Motion Picture and Television Engineers), EBU (European Broadcasting Union), and/or the recommendations or standards of other industry, governmental or quasi-governmental bodies.

The array of memories 102 provides five outputs comprising time-delayed versions of $Y_1$, which, along with $Y_{in}$ itself, provide six time-spaced versions of the input luminance signal: two in a first television field F0, two in a second television field F1 and two in a third television field F2.

The time-spacing of the six signal streams with respect to the spatial location of pixels (television picture elements) in the three consecutive fields may be better understood by reference to the representation of FIG. 2. FIG. 2 is a quasi-three-dimensional representation in which the vertical and horizontal dimensions lie in the plane of a television picture field such that the vertical axis is the vertical direction of a television picture field, perpendicular to the scan lines, the horizontal axis is the horizontal direction of the television picture field, parallel to the scan lines, and the direction perpendicular to the plane of each field is a quasi-time axis in which each consecutive field is shown at a discrete time. At some arbitrary time during the active picture information of a television field, a pixel may be represented as point P(F0−1H) in field F0. That pixel is shown in FIG. 2 as a point in a horizontal scan line. A second pixel in field F0, pixel PF0, occurring one line later in time, is directly below pixel P(F0−1H) vertically and is shown as a point in the next lower horizontal scan line. A first pixel in field F1, occurring 262 lines (in the case of NTSC, for PAL, 312 lines) after pixel P(F0), and a second pixel in field F1, occurring 263 lines (in the case of NTSC, for PAL 313 lines) after pixel P(F0), may referred to as pixel P(F1−1/2H) and pixel P(F1+IhH), respectively. Pixel P(F1−1/2H), shown as a point in a first horizontal scan line, is directly above pixel P(F1+1/2H) vertically, which pixel is shown as a point in the next lower horizontal scan line. A point P(F1) in field F1, corresponding spatially to the location in which pixel P(F0) of field F0 lies, is half way between pixel P(F1−1/2H) and pixel P(F1+1/2H) due to the interlacing offset of horizontal scan lines from field to field. Thus, pixel P(F1−1/2H) precedes, by the time of one-half line, the point P(F1), while pixel P(F1−1/2H) is, by the time of one-half line, after the point P(F1). The spatial point in field F2 corresponding to F0 and F1 is the location of pixel P(F2), occurring 525 lines, exactly one frame or two fields, after pixel P(F0). Pixel P(F2) is shown as a point in a horizontal scanning line in field F2. A second pixel in field F2, P(F2−IH), occurring one horizontal line time earlier, is shown as a point in the horizontal scan line immediately above the scan line containing pixel P(F0).

Returning again to FIG. 1, wherein the details of the array of field and line memories 102 are shown, the undelayed input luminance signal stream $Y_{in}$, itself provides the F0−1H output stream. The input luminance signal stream $Y_{in}$ is applied to a first 1H (one horizontal line time) delay 104 to provide the F0 output stream. The output of delay 104 is also applied to a first nH delay 106 (where n is 262 lines for NTSC, 312 lines for PAL) to provide the F1−1/2H) output stream. The delay 106 output is applied to a further 1H delay 108, to provide the F1+1/2H output stream and to a further nH delay 110 (where n is 262 lines for NTSC, 312 lines for PAL) to provide the F2−1H output stream. The delay 110 output is also applied to yet a further 1H delay 112 to provide the F2 output stream. The delays may be implemented by various hardware, software and hybrid hardware/software techniques well known to those of ordinary skill in the art. Although the delays are shown as series delays, they may be implemented in other ways such as by a multiport random access memory in which the signal stream is read in once and read out multiple times or by other equivalent ways.

Thus, the array of memories 102 provides six signal output streams corresponding to six pixel locations, two in each of three consecutive fields: pixels at time positions F0−1H and F0 in field F0, pixels at time positions F1−1/2H and F1+1/2H in field F1, and pixels at time positions F2−1H and F2 in field 2.

A field motion detector 114, described below, receives the F0, F1−1/2H and F1+1/2H signal streams, signals spaced apart in time by one field minus one-half line and by one field plus one-half line. It is known to apply such inputs to field motion detectors—see, for example, U.S. Pat. Nos. 4,982,280 and 5,291,280. The purpose of the field motion detector is to detect motion (having a velocity greater than, for example, one half line per field) from interlaced field to interlaced field without falsely detecting motion when a vertical transition occurs (for example, when the portion of the picture below a horizontal line is black and the portion of the picture above the line is white, or vice-versa). Although a field motion detector of the type disclosed in said U.S. Pat. No. 5,291,280 may be employed in aspects of the present invention, it is preferred to employ the improved field motion detector described below, which forms an aspect of the present invention, because of its greater resistance to false detection caused by certain types of vertical transitions. While a field motion detector such as that of the U.S. Pat. No. 4,982,280 may be employed in aspects of the present invention, the field motion detector of said U.S. Pat. No. 5,291,280 is preferable to that of the U.S. Pat. No. 4,982,280 in that the earlier patent provides no immunity to false detection resulting from vertical transitions. The output of the field motion detector 114, $F0_m$, is applied to an NTSC film detector 118 and to a PAL film detector 120, each of which is described below.

Optionally, a second field motion detector (not shown) below may receive the F2, $F1^{1/2H}$ H and F1+1/2H signal streams, signals also spaced apart in time by one field minus one-half line and by one field plus one-half line. Such a second field motion detector could be used to provide additional redundancy or to provide increased accuracy in processing.

The F0 and F2 outputs of memories 102 are applied to a frame motion detector 114 where the two signals are compared on a pixel by pixel basis. The output of the frame motion detector, "MOTION," is applied to the NTSC film detector 118, the PAL film detector 120, and to a sawtooth based edit detector 126, described below. The MOTION signal may also be applied as an input to an interlace-to-line-doubled progressive-scan converter as shown in FIG. 3. Frame motion detectors receiving F0 and F2 signal stream inputs are known in the prior art—see, for example, said U.S. Pat. No. 4,982,280, said U.S. Pat. No. 4,967,271 and said U.S. Pat. No. 5,291,280. Various frame motion detectors, including those of said U.S. Pat. Nos. 4,982,280, 4,967,271 and 5,291,280, may be employed as the frame motion detector in aspects of the present invention. However, it is preferred to employ the improved frame motion detector, which forms an aspect of the present invention, described below.

The F0−1H, F0, F1−1H and F1+1H signal streams and the F2, F2−1H, F1−1H and F1+1H signal streams, respectively, are applied to an F0 sawtooth detector 128 and an F2 sawtooth detector 130. Each sawtooth detector looks for the zigzag artifact that an incorrect interleaving of field 1 and field 0 or field 1 and field 2 would yield. The outputs of these two detectors, $F0saw$ and F2Saw, respectively, are applied to the sawtooth-based edit detector 126. Sawtooth detectors are disclosed in U.S. Pat. No. 5,625,421. The sawtooth detection techniques forming an aspect of the present invention differ from those in said U.S. Pat. No. 5,625,421 in that the sawtooth detectors of the patent operate after interlace-toprogressive conversion (after line doubling) instead of before such conversion.

As explained further below, the NTSC and PAL film detectors (118 and 120, respectively) examine the accumulated field motion between field 0 and field 1 and then search for the field motion film sequence pattern (a "10100" pattern in NTSC and a "10" pattern in PAL) before determining that the material is film and not video. In said U.S. Pat. No. 4,982,280, frames, instead of fields, are compared in the film detectors. The film detectors of the U.S. Pat. No. 4,982,280 impose a minimum size constraint instead of accumulating pixel differences. Nevertheless, a state machine as in said U.S. Pat. No. 4,982,280 may be employed in the film detectors of the present invention. The film detectors are reset by an edit Y/N (yes/no) signal when a "bad edit" is detected. A bad edit means an edit performed in video on film material when two complete film frames have not been removed, thereby breaking the 3-2 pulldown ratio. A film sequence might look like

AAABBCCCDDEEEFF, a good edit might look like

AAABBEEEFF, and a bad edit might look like

AAACCCDDEEEFF, where A, B, etc. are video fields derived from a particular motion picture frame (frame A, B, etc.).

The outputs of the film detectors are two signals, a film Y/N (yes/no) signal and an F0/F2 signal. The film Y/N chooses the mode under which the line doubler functions (see FIG. 3). The F0/F2 signal selects which field signal stream, F0 or F2, for the line doubler (see FIG. 3) to interleave (merge) with the F1−1/2H when the material is film. The film Y/N and F0/F2 signal may be applied as inputs to an interlace-to-line-doubled progressive scan converter as shown in FIG. 3.

The outputs of one of the two film detectors are selected by a double-pole double throw switch 132. The switch is controlled by an externally supplied NTSC/PAL signal. This selects the appropriate film detector to be active dependent upon the input video format. The PAL film detector may also be employed to detect 30 frame/second sources in NTSC signals, in which case the switch 132 is placed in the PAL switch position.

The output of the F0 and F2 sawtooth detectors (128 and 130), F0$_{s,,,}$ and F2$_{Ssaw}$ along with the motion signal, film Y/N and F0/F2 signals are combined in the sawtooth based edit detector 126 to create the edit Y/N signal used for resetting the film detectors 118 and 120. An edit Y signal immediately resets the film Y/N signal to N.

Referring now to FIG. 3, which shows an interlace to line doubled progressive scan converter environment in which the present invention or aspects thereof may be employed, the input signal Y;$_1$, (see comments above regarding the nature of Y$_1$) is applied to block 302, which includes the various functions of the FIG. 1 arrangement. Block 302 provides a first video stream having the F0 timing, a second video stream having the F1−1/2H timing (i.e., nominally 1 field time after the F0 stream timing), and a third video stream having the F2 timing (where F0, F1−$^1$ H and F2 are as described in connection with FIGS. 1 and 2). The F1−1/2H video stream provides the "direct" field Y$_{dir}$ to one input of a line doubler pair 304. The F0 and F2 video streams are applied to a non-film video processor 306 and a film video processor 308. Block 302 applies its F0/F2 output to the film video processor 308 and its film Y/N output to the control input of a single-pole double-throw switch 310. The output of switch 310 provides the "interpolated" field, Y;$_{ino}$ to the other input of the line doubler pair 304. The outputs from the line doubler pairs 304 are combined to provide the output signal Y our.

In operation, scanning lines from the interpolated field Y$_{in}$, are interleaved with the scanning lines from the direct field Y$_{dir}$. The interpolated field scanning lines are taken either from the F0 or the F2 video stream, in the case of a motion picture film source, or, when the source is not motion picture film, are synthesized by any of various known techniques such as intra-field interpolation, inter-field interpolation, a combination of intra field and inter-field interpolation, or some other known technique. The example of FIG. 3 assumes that the non-film video processor 306 operates adaptively in response to the applied motion signal such that it employs inter-field interpolation for conditions of no motion or low motion (for example, by averaging F0 and F2) and intra-field interpolation for conditions of medium to high motion. The film video processor selects either the F0 or F2 video stream in response to the F0/F2 signal when a film source is detected, assuring that the correct field is merged with the direct field.

Field Motion Detector

Details of the field motion detector of FIG. 1 are shown in FIG. 4. The field motion detector compares temporally adjacent pixel information of opposing field parity (field 0 and field 1, for example) and differentiates field-to-field motion from vertical picture transitions to provide a field motion signal.

Each field motion detector includes three subtractors (402, 404 and 406), a keep smaller absolute value function 408, a magnitude comparator 410, and a motion/no-motion switch 412. Subtractor 402 receives the F1−1/2H and F0 signals. Subtractor 404 receives the F0 and F1+1/2H signals. Subtractor 406 receives the F1−'/:!H and F1+1/2H signals. The field motion detector described in U.S. Pat. No. 5,291,280 (see, e.g., FIG. 3) employs subtractors 402 and 404, receiving the same inputs as just described, and the keep smaller absolute value function 408. The field motion detectors of the present invention may use the same keep smaller absolute value function arrangement as in said U.S. Pat. No. 5,291,280.

Inter-field subtractions yield field motion but also incorrectly detect vertical transitions as motion. The keep smaller absolute value function chooses the smaller of the two inter-field subtractions and thereby differentiates high frequency vertical transitions from motion. Unfortunately low frequency vertical transitions are still detected as motion. To overcome this shortcoming, the field motion detector of the present invention adds a single line vertical differentiator (the third subtractor 406), whose output, a measure of vertical energy, is compared in magnitude comparator 410 to the output of the keep smaller absolute value function 408, an measure of field motion. Subtractor 406, functioning as a single line vertical differentiator, looks for a vertical transition within a field. If the magnitude of the vertical transition is greater than the magnitude of the field motion, then a vertical transition was incorrectly determined to be motion so the output switch goes to the NO position and no motion is detected. However, if the field motion is greater than the vertical energy, the motion value YES is output. This yields a more precise motion detection. It will be noted that sign of motion information signals from the subtractors are irrelevant in view of the keep smaller absolute value function.

The inability of the prior art field motion detector to differentiate between low frequency vertical transitions and motion versus the performance of the improved field motion detector of the present invention may be better understood by reference to FIGS. 5-10 which depict idealized representations of pixel amplitudes (in consecutive lines) (i.e., vertical pixels rather than horizontal pixels) versus time in time-spaced video streams for various signal conditions and the resulting field motion detector signal outputs. FIGS. 5-7 relates to the prior art field motion detector as disclosed in said U.S. Pat. No. 5,291,280 (which, as noted above, forms a portion of the improved field motion detector of the present invention), while FIGS. 8-10 relate to the improved field motion detector of the present invention. In referring to FIGS. 5-10, reference may be made to FIG. 2 to appreciate more fully the relative position of the various pixels in the interlaced video fields.

Referring now to FIG. 5 (prior art—high-frequency vertical transition, no motion), FIG. 5A shows pixel amplitudes in consecutive lines in the video stream F0; FIG. 5B shows pixel amplitudes in the video stream F1−1/2H (262 lines in time after the F0 video stream); and FIG. 5C shows pixel amplitude values in the video stream F1+'/2H (263 lines in time after the F0 video stream). Subtractor 402 produces the output shown in FIG. 5D (one pixel), while subtractor 404 produces the output shown in FIG. 5E (no pixels). The keep smaller absolute value function 408 thus produces the output shown in FIG. 5F (no pixels). This output, the output that would be provided by the field motion detector of said U.S. Pat. No. 5,291,280, is the correct output—the high-frequency transition in the presence of no motion results in the correct "no motion" output for each of the pixel positions.

Referring now to FIG. 6 (prior art—high-frequency vertical transition, motion), FIG. 6A shows pixel amplitudes in consecutive lines in the video stream F0; FIG. 6B shows pixel amplitudes in the video stream F1−1/7H (262 lines in time after the F0 video stream); and FIG. 6C shows pixel amplitude values in the video stream F1+1/1H (263 lines in time after the F0 video stream). Subtractor 402 produces the output shown in FIG. 6D (two pixels), while sub tractor 404 produces the output shown in FIG. 6E (three pixels). The keep smaller absolute value function 408 thus produces the output shown in FIG. 6F (two pixels). This output, the output that would be provided by the field motion detector of said U.S. Pat. No. 5,291,280, is the correct output—the high-frequency transition in the presence of motion results in the correct "motion" output (motion signals at pixel positions in two lines, indicating the amplitude of the relative field to field motion).

Referring now to FIG. 7 (prior art—low-frequency transition, no motion), FIG. 7A shows pixel amplitudes in consecutive lines in the video stream F0; FIG. 7B shows pixel amplitudes in the video stream F1−1/2H (262 lines in time after the F0 video stream); and FIG. 7C shows pixel amplitude values in the video stream F1+1/2H (263 lines in time after the F0 video stream). Each shows slowly increasing pixel values as would occur in the case of a low-frequency vertical transition (a fade from black to white). Subtractor 402 produces the output shown in FIG. 7D (four low level pixels), while subtractor 404 produces the output shown in FIG. 7E (four low level pixels). The keep smaller absolute value function 408 thus produces the output shown in FIG. 7F (three low level pixels). This output, shown in FIG. 7H, the output that would be provided by the field motion detector of said U.S. Pat. No. 5,291,280, is an incorrect output—the low-frequency transition in the presence of no motion results in an incorrect "motion" output (low amplitude motion signals at pixel positions in three lines).

Referring now to FIG. 8 (present invention—high-frequency vertical transition, no motion), FIG. 8A shows pixel amplitudes in consecutive lines in the video stream F0; FIG. 8B shows pixel amplitudes in the video stream F1−1/2H (262 lines in time after the F0 video stream); and FIG. 8C shows pixel amplitude values in the video stream F1+1/2H (263 lines in time after the F0 video stream). Subtractor 402 produces the output shown in FIG. 8D (one pixel), while subtractor 404 produces the output shown in FIG. 8E (no pixels). The keep smaller absolute value function 408 thus produces the output shown in FIG. 8F (no pixels). Subtractor 406 produces the output shown in FIG. 8G (one pixel). Since the subtractor 406 output, indicating vertical energy, is greater than the keep smaller absolute value function 408 output, the magnitude comparator cause the switch 412 to its no position, resulting in no output, indicating no motion. The output, shown in FIG. 8H, is the same as the prior art (see FIG. 5).

Referring now to FIG. 9 (present invention—high-frequency vertical transition, motion), FIG. 9A shows pixel amplitudes in consecutive lines in the video stream F0; FIG. 9B shows pixel amplitudes in the video stream F1−1/2H (262 lines in time after the F0 video stream); and FIG. 9C shows pixel amplitude values in the video stream F1+1/2H (263 lines in time after the. F0 video stream). Subtractor 402 produces the output shown in FIG. 9D (two pixels), while subtractor 404 produces the output shown in FIG. 9E (three pixels). The keep smaller absolute value function 408 thus produces the output shown in FIG. 9F (two pixels). Subtractor 406 produces the output shown in FIG. 9G (one pixel). Since the subtractor 406 output, indicating vertical energy, is less than the keep smaller absolute value function 408 output, the magnitude comparator moves the switch 412 to its yes position for two pixel times, resulting in the keep smaller absolute value output being provided as the field motion detector output, indicating motion with those amplitudes at the two pixel positions. For the remaining pixel positions, the subtractor 406 output is greater than the keep smaller absolute value function 408 output so that the magnitude comparator places the switch 412 in its no position, resulting in no output, indicating no motion. The results, shown in FIG. 9H, are the same as the prior art (see FIG. 6).

Referring now to FIG. 10 (present invention—low-frequency vertical transition, no motion), FIG. 10A shows pixel amplitudes in the video stream F0; FIG. 10B shows pixel amplitudes in consecutive lines in the video stream F1−1/2H (262 lines in time after the F0 video stream); and FIG. 10C shows pixel amplitude values in the video stream F1+1/2H (263 lines in time after the F0 video stream). Subtractor 402 produces the output shown in FIG. 10D (four low level pixels), while subtractor 404 produces the output shown in FIG. 10E (also four low level pixels). The keep smaller absolute value function 408 thus produces the output shown in FIG. 10F (four low level pixels). Subtractor 406 produces the output shown in FIG. 10G (four higher level pixels). Since the subtractor 406 output, indicating vertical energy, is more than the keep smaller absolute value function 408 output, the magnitude comparator moves the switch 412 to its no position, resulting in no output, indicating no motion. The output, shown in FIG. 10H, is correct and different from the prior art (see FIG. 8). Thus, the improved field motion detector of the present invention retains the ability of the prior art to differentiate high-frequency transitions from motion while adding the capability to differentiate low-frequency vertical transitions from motion.

Frame Motion Detector

The frame motion detector 124 (FIG. 1), shown in detail in FIG. 11, compares the F0 and F2 video stream signals on a pixel by pixel basis to determine if the corresponding pixel in field F1 is likely to be in motion. Many prior art frame detectors may be used in aspects the present invention, although the improved frame motion, which is about to be described, is preferred.

In the frame motion detector described in said U.S. Pat. No. 4,982,280, high frequency motions are filtered out. This was done to keep any subcarrier residue from being detected as motion. The frame motion detector constituting an aspect of the present invention provides improved differentiation of motion and subcarrier signal components.

In the improved frame motion detector forming a part of the present invention, a frame subtraction is performed between F0 and F2 in subtractor 1102. The subtractor 1102 output is then put through complementary lowpass and highpass filters created by a lowpass filter 1104 and subtractor 1106. In a digital embodiment, the lowpass filter may be a fivetap FIR filter with a zero at the color subcarrier frequency (in a frame detector intended for use with both NTSC and PAL, the filter characteristics may be switchable in accordance with whether an NTSC or PAL signal is being processed). The horizontal lowpass filtered path (where most of the motion lies) on line 1108 is rectified in rectifier 1110, and applied to a threshold function 1112 which removes noise components by applying a motion LPF noise threshold. In a digital implementation, the threshold 1112 may, for example, limit the signal to four bits (from, say, eight bits). The horizontal highpass filtered path on line 1114 goes into complementary vertical lowpass and highpass filters created by subtractor 1116, adder 1118 and delay 1120 (which provides a one-line delay for NTSC and a two-line delay in PAL). These paths, vertical HPF path 1122 and vertical LPF path 1124, are then individually rectified in rectifiers 1126 and 1128, respectively, and have their own thresholds (threshold functions 1130 and 1132, respectively, which remove noise components by applying a motion HHPF-VHPF Noise threshold and a motion HHPF-VLPF Noise threshold, respectively) (where HHPF is horizontal highpass filter, etc.). In a digital implementation, the thresholds 1130 and 1132 may also limit the respective signals to 4 bits.

Thus, three paths are provided: a horizontally lopass filtered (HLPF) path, a horizontally highpass filtered and vertically highpass filtered(HHPF-VHPF) path, and a horizontally highpass filtered and vertically lowpass filtered (HHPF-VHPF) path. The purpose of three paths is to separate color subcarrier signal components from true motion information. The HLPF path output has substantially no subcarrier signal components as a result of the horizontal lowpass filtering action of LPF 1104. The two HHPF paths, carrying the complement of the HLPF path, require vertical filtering to reduce the subcarrier signal components present in the high-frequency portion of the spectrum. Such components have the appearance of a vertical line pattern which may occur in real television scenes. The filtering action of the HHPF-VHPF path passes low amplitude level subcarrier signal components. By setting the HHPF-VHPF threshold sufficiently high, true motion is differentiated from the subcarrier components. The filtering action of the HHPF-VLPF path rejects subcarrier components (which have a vertical component because they are out-of-phase from line to line) but passes horizontally moving patterns of lines (referred to as "moving multiburst") which must be detected as motion (such a pattern is rejected by the other two paths). The HHPF-VLPF path may have a lower threshold level than does the HHPF-VHPF path because the HHPF-VLPF path is not differentiating desired from undesired signal components based on amplitude. The HLPF and HHPF-VLPF threshold levels are selected for noise immunity.

The three differently filtered motion paths are then combined in summer 1134 and expanded in expansion function 1136. Preferably, they are expanded horizontally by 5 pixels, temporally by 1 field and vertically by 1 line. Techniques for such horizontal, vertical and temporal expansion are known. See for example, said U.S. Pat. No. 5,488,422. The output of block 1136 is applied to one input of a keep greater value function 1138 and to a 262H/312H (262 lines for NTSC, 312 lines for PAL) delay, the output of which is applied as a second input to block 1138, and to a 1H (one line) delay 1142, the output of which is applied as a third input to block 1138. Blocks 1136-1142 provide a temporally and vertically expanded motion signal. The purpose of the temporal and vertical expansion is twofold—to avoid the situation when a fast moving object leaves a "hole" between frames (e. a, a swinging pendulum) and, in the case of an NTSC signal to avoid an appearance of fluttering between sharp and soft pictures when film material is not detected as film material. Also, expansion assures that the frame motion signal "surrounds" the field motion signal in the film detectors.

The frame motion detector has three adjustable parameters: the motion LPF noise threshold, the motion HHPF-VLPF noise threshold, and the motion HHPF-VHPF noise threshold. The parameters should be adjusted to as to minimize false detection of motion caused by noise and subcarrier signal components.

Film Detectors

Functionally, an NTSC film detector 118 is provided separate from a PAL film detector 120. In practical embodiments, the two detectors are likely to share circuitry and/or functions. Both film detectors have the same purpose, to determine the onset of a film pattern, thus entering the film mode (indicated by putting the film Y/N signal in its Y (yes) condition), and, after entering the film mode, when the film pattern is broken, thus exiting the film mode (indicated by putting the film Y/N signal in its N (no) condition). A different film pattern is native to each video format (NTSC or PAL) (resulting from 24 frame/second film sources in NTSC and 25 frame/second film sources in PAL). Both film detectors share certain characteristics and principles of operation. Both receive the $F0_B$, output of the field motion detector 114, the motion output of the frame motion detector 124, and the edit Y/N signal from the sawtooth based edit detector 126. The primary input is the field motion detector's F0. signal. The frame motion signal serves as a verification of the field motion signal. The edit Y/N signal provides an early indication, based on the detection of signal conditions that produce sawtooth artifacts, that the film pattern has been broken.

Typical film detectors in the prior art intended to detect 24 frame/second motion picture sources in NTSC television signals (see, e.g., said U.S. Pat. Nos. 4,982,280 and 5,291,280) were frame based rather than field based. However, a field based film detector for detecting 25 frame/second motion in PAL television signals is disclosed in Published International Patent Application WO 94/30006. The present NTSC and PAL film detectors are an improvement on the field based PAL film detector in said international application. Thus, for example, the frame based film pattern for NTSC is a five frame sequence—Zero followed by four ones (as is well known, this pattern occurred for conditions of motion in the motion picture source, no motion caused the ones to become zeros, but the particular zero position had to remain a zero under all conditions to guarantee a film source). In the improved field based detection technique of the present invention, three zero positions must remain zero in a five field sequence under all film motion conditions (the two one positions may assume either a one or zero condition), thus allowing faster detection of a disruption in the film pattern.

In addition, the present film detector is responsive to an edit Y/N signal provided by the sawtooth based edit detection functions such that when the signal goes to its Y state, the film detector immediately leaves the film mode and the detector's film Y/N signal output immediately goes to N. The edit Y signal provides an indication within a field that the film sequence pattern, thus providing an early indication before the film sequence pattern detector can make such a determination (the pattern detector requiring at least a field to detect an error). Thus, the edit Y/N signal provides a second way (the first being an interruption of the film pattern) to exit the film mode.

In frame based edit detection there is one type of edit that is not detected because the sequence is not broken (the sequence AAABB 122233—see the discussion below under the heading "Sawtooth Detectors"). All edits are detected as bad edits in the field based detection (except for the one "good" edit, which is allowable—see above for example of a "good edit").

NTSC Film Detector

The NTSC film detector 118 (FIG. 1) receives the $F0_m$m, output of the field motion detector 114, the motion output of the frame motion detector 124, and the edit Y/N signal from the sawtooth based edit detector. NTSC film detector 118 looks for 24 frame/second sources in NTSC television signals. It examines the accumulated field motion between field 0 and field 1 and then searches for the field motion film sequence pattern "1 0 1 0 0" before determining that the material is film and not video. Fibre 12 shows the details of the NTSC film detector.

The primary input to the NTSC film detector is the $F0_B$, output of the field motion detector 114 (FIG. 1). The $F0_B$ signal is filtered in low-pass filter 1202 to remove subcarrier residue, rectified in rectifier 1204, and blanked by film motion blanking function 1206 to keep any picture edge artifacts and subtitles from being detected as motion. The rectified and blanked motion signal is then applied to a threshold 1208 to reduce noise artifacts. The threshold is set by a fixed and predefined film noise threshold. In a parallel path the motion input from the frame motion detector is thresholded by a threshold 1210 into, in a digital implementation, a one-bit motion yes/no signal. This threshold is set by a motion threshold. The one-bit motion yes/no signal is then used to control a motion-no motion switch 1212. The frame motion indication serves as a verification of the field motion indication—if there is no frame motion at a given pixel then there cannot be any field motion for the same pixel (the frame motion has been expanded horizontally and vertically to assure that the band of frame motion surrounds the field motion). The one-bit field motion signal from switch 1212 is then accumulated over the entire field in a field rate accumulator 1214.

At the end of each field the data is latched in and the motion value is then passed into three parallel paths, 1216, 1218 and 1220: 1) path 1216 to a minimum of five field detector 1222 (although a minimum of five fields is preferred to provide a safety margin, a minimum of three fields is practicable), 2) path 1218 to a three field weighted averager 1224, and 3) path 1220 to one side of a subtractor 1226 where end-of-field calculations are performed. At the beginning of each field the accumulators are reset.

Because the field motion is not precise, a non-moving field might have a non zero value associated with it. The minimum of five field detector 1222 looks at five adjacent fields for the minimum motion. For film in five adjacent fields there will always be a non-moving field, and therefore the minimum motion value will correspond to it. This output provides the other input to the subtractor 1226 in order to remove the base motion value associated with a non-moving field from the accumulator 1214 output on path 1220. The subtractor 1226 output is then passed to a variable threshold 1228 whose threshold is determined by the output of block 1224, the weighted average of three fields.

Inasmuch as the motion threshold is dependent on the motion of the picture information, picture information with little motion will have a lower threshold than material with lots of motion. The minimum motion detector 1222 and the weighted averager 1224 greatly increase the sensitivity of film detection on small moving scenes and factor out computer generated material which violates the Nyquist criterion. The output of the variable threshold 1228, a "1" for a moving field and a "0" for a non-moving field, is then fed into a state machine 1230 that looks for the recurring sequence 10100. State machine 1230 may be of the type described in said U.S. Pat. No. 4,982,280. Once the number of film sequences detected reaches the film sequence acquisition number, the film mode is activated. The film sequence acquisition number, the number of times the pattern must repeat to indicate detection of a film sequence, is set by the system designer. For example, the number might be three for u NTSC (although one might suffice) and five or six for PAL, which has a less unique film pattern.

The transition to video mode occurs upon either of two conditions: 1) when the film sequence is disrupted by a "0" being replaced with a "1" (note that once in film mode a "1" field can be replaced with a "0" field, as is the case of a non-moving field, but a non-moving field cannot be turned into a moving one), or 2) the edit Y/N signal goes high (yes).

Because the NTSC film detector of the present invention is field based, there are three places in the five field sequence that a bad edit can cause the film detector to drop out of film mode compared to the one place under the frame motion film detection scheme—01111. As explained above, a "0" cannot become a "1" but a "1" can become a "0" so the field motion sequence has three "0" s that can be used as an edit detector compared to the one "0" on the frame based film sequence. This will have the effect of minimizing the negative visual effects of bad edits.

The NTSC film detector has seven parameters: a film noise threshold, a motion threshold, an NTSC film sequence acquisition number and four film blanking parameters that define the area of film motion detection in order to minimize edge effects: film blanking top line, film blanking bottom line, film blanking right side, and film blanking left side.

PAL Film Detector

The PAL film detector 120 (FIG. 1) looks for 25 frame/second sources in PAL television signals and it may also look for 30 frame/second sources in NTSC television signals. It examines the accumulated field motion between field 0 and field 1 and then searches for the field motion film sequence pattern "1 0" before determining if the material is film and not video. Details of the PAL film detector are shown in FIG. 13.

The PAL film detector receives the same F0 field motion signal $_{F0mm}$ at its input and performs the same pixel rate processing as the NTSC film detector 118 (FIG. 1) of FIG. 6. In practice, the lowpass filter 1202, the rectifier 1204, the blanking circuit 1206, the noise threshold 1208, the motion threshold 1210, the motion/no-motion switch 1212 and the field rate accumulator 1214 are common to the NTSC and PAL film detectors. Corresponding elements in the PAL film detector are assigned corresponding "13xx" reference numerals. The common element, being described in connection with the NTSC film detector of FIG. 6, will not be described again.

The end-of-field calculations performed in PAL differ from NTSC because the sequence being detected in NTSC differs from the one being detected in PAL. The PAL recurring film sequence is "1 0". This sequence can occur on video material for a few frames in a row so care must be taken to differentiate this case. First the current field motion (B) from field rate accumulator 1314 is compared, in comparator 1340, in magnitude with the last field motion (A), derived by delaying the field rate accumulator 1314 output in a 1 field delay 1342 (which may be implemented as a flip-flop clocked at the field rate by the vertical sync signal) to form a motion sign signal at the comparator 1340 output.

If the current value is greater than the previous motion value a "1" is output, conversely a "0" is output if the current value is less than or equal to the previous motion. In a parallel path the two motions, the current field motion (B) and the last field motion (A), are modified by an operator 1344 to form the ratio I (A−B)/[(A+B)/2] I. This function, the absolute value of the difference divided by the average, corresponds to an adjacent field motion ratio, which is then passed to a threshold 1346 whose output is gated in AND-gate 1348 with the motion sign signal. The introduction of the minimum motion constraint is required because the motion sign signal does not care if the difference between A and B is 1 or 1000. For video material it is not uncommon to obtain motion values such as the following: 1000, 1410, 1400 and 1510. These would yield a "0 1 0 1" from the motion sign signal—a film-like pattern. A small motion film source might have the values as follows: 6, 100, 5, 110. Thus a PAL minimum motion ratio will help differentiate between film and video. Alternatively, but less desirably, the arrangement in the NTSC film detector between the field rate accumulator (1214 in FIG. 12, 1314 in FIG. 13) and the state machine (1230 in FIG. 12, 1350 in FIG. 13) may be used.

If the minimum motion ratio constraint is met, then the motion sign is fed into the PAL film state machine 1350, which may be the same type of state machine as in said U.S. Pat. No. 4,982,280. If not, a 0 is input. PAL film mode is entered once the number of film sequences reaches the PAL film sequence acquisition number.

As in the case of NTSC the transition to video mode occurs upon either of two conditions: 1) when the film sequence is disrupted, or 2) when the edit Y/N signal goes high. It should be noted that a single film state machine may be used for the NTSC and PAL film detectors provided that a look-up table is used appropriate for the respective video standard.

The PAL film detector, like the NTSC film detector, has eight adjustable parameters: a film noise threshold, a motion threshold, a PAL film sequence acquisition number, a PAL minimum motion ratio and four film blanking parameters that define the area of film motion detection: film blanking top line, film blanking bottom line, film blanking right side, film blanking left side.

Sawtooth Detectors

The sawtooth detectors 128 and 130 (FIG. 1) look for the "sawtooth" artifact that an incorrect interleaving of F1 and F0 or F1 and F2 yields. Details of the sawtooth detectors are shown in FIG. 14.

A sawtooth is characterized by the even numbered lines having similar vertical content and the odd numbered lines also having similar content—the odd lines being horizontally offset from the even lines as depicted in FIGS. 15A-15D. Sawtooth artifacts are explained further in said U.S. Pat. No. 5,625,421. FIG. 15A shows the displayed appearance of a vertical bar when the lines are correctly interleaved. FIG. 15B shows the same vertical bar when the lines are incorrectly interleaved. FIG. 15C shows a diagonal bar when the lines are correctly interleaved. FIG. 15D shows a diagonal bar when the lines are incorrectly interleaved.

Each sawtooth detector includes a bank of four subtractors 1402, 1404, 1406 and 1408. For ease of understanding, assume that even numbered lines are in field 0 and odd numbered lines are in field 1 (with reference to FIG. 2, let the line containing pixel PF0-1H be line 0, the line containing pixel $P_{F0}$ line 2, the line containing pixel PF1:, H line 1 and the line containing pixel $P_{F,+,H}$ line 3):

| Subtractor | Signals Subtracted | Diagram Subtractions |
|---|---|---|
| Subtractor 1402 | (F0 − 1H) − F0 | Line 0-Line 2 |
| Subtractor 1404 | F0 − (F1 + ½H) | Line 2-Line 1 |
| Subtractor 1406 | (F1 − ½H) − (F1 + ½H) | Line 1-Line 3 |
| Subtractor 1408 | (F0 − 1H) − (F1 − ½H) | Line 0-Line 1 |

FIG. 14 and the above table shows signals present in the F0 sawtooth detector. For the F2 sawtooth detector, substitute "F2−1/7H" for "F0−1/2H" and "F2" for "F0."

The output of subtractors 1402-1408 proceed through four identical parallel paths 1410-1416, each comprising four elements: a lowpass filter (1418, 1420, 1422 and 1424, respectively) to remove any subcarrier residue and noise; a rectifier (1426, 1428, 1430 and 1432, respectively); an edit blanker (1434, 1436, 1438 and 1440, respectively) to keep any picture edge artifacts from being detected as a sawtooth, and a threshold (1442, 1444, 1446 and 1448, respectively). The thresholds of the intra-field subtractions 1402 and 1406 are the same and require that the output be small thereby revealing that they align vertically. The thresholds of the inter-field subtractions 1404 and 1408 are the same and require that the output be large, indicating that there is a horizontal displacement of the transition from field to field. The outputs of the four threshold circuits are applied to an AND-gate 1450: the outputs of thresholds 1442 and 1446 are applied through an inverting input. Thus, the four signals are combined such that when the outputs of subtractors 1402 and 1406 are below the threshold and the outputs of subtractors 1404 and 1408 are above the threshold, ' a sawtooth is predicted. The output of AND-gate 1450 is $F0_{sa\,r}$ ($F2_{saw}$ from the F2 sawtooth detector).

The sawtooth detectors have six adjustable parameters: a sawtooth 2H similarity threshold, a sawtooth 1H difference threshold, and four edit blanking parameters that define the area of edit motion detection: edit blanking top line, edit blanking bottom line, edit blanking right side, and edit blanking left side.

Although the $F0_{,,,,}$ and $F2_{saw,,,}$ signals indicate when isolated sawtooth artifact signal conditions occur, more information is required to determine that a bad edit has occurred. The purpose of the sawtooth based edit detector 126 is to process the $F0_s a_w$ and F2saw signals along with other information to identify a bad edit with reasonable reliability.

The sawtooth based edit detector 126 (FIG. 1), receiving the $F0_{saw}$ and F2saw signals, the $F1-^1$ H signal and the frame motion signal, looks for predicted sawtooth artifacts on field 0 and field 2 relative to field 1. The number of sawtooths per line are accumulated and compared with the number of moving horizontal transitions in the $F1-^1$ H signal. In the currently displayed field (F1), if the ratio of sawtooths versus moving edges meets the minimum ratio and this ratio is met over a predefined number of adjacent lines, then an edit is detected. On the non-displayed or alternate field (F0 or F2), if there are more sawtooths than moving edges and there are sawtooths detected on the currently displayed field and this occurs over a predefined number of adjacent lines, an edit is detected. The details of the sawtooth based edit detector are shown in FIG. 16.

The sawtooth based edit detector has two distinct input portions: a moving edge detecting input portion and a sawtooth detecting input portion. The moving edge detecting input portion receives the F1−'/H signal input and applies it to a horizontal differentiator 1602 which looks for horizontal transitions. This may be implemented by a one-clock (one pixel) delay 1604 and a subtractor 1606. The differentiator 1602 output is then filtered by a lowpass filter 1608, rectified by rectifier 1610, blanked by edit blanker 1612 and applied to a threshold 1614 which provides noise thresholding under control of an H edge (horizontal edge) threshold. In a parallel path the frame motion signal is also thresholded by threshold 1616 under control of a motion threshold to form a motion yes/no signal which is then ANDed in AND-gate 1618 with the horizontal transition signal. allowing only moving horizontal edges to pass. Moving horizontal edges are applied to an H rate (horizontal rate) moving horizontal edge accumulator 1620 in which the number of distinct moving edges, determined by detecting their peaks, is accumulated over the course of one line.

The sawtooth detection input portion receives the $F0_{,.,}$ and $F2_{saw}$ outputs from the F0 sawtooth detector and the F2 sawtooth detectors, respectively. The $_{F0Saw}{}^{and}{}_{F2saw}$ signals are applied to respective H min (horizontal minimum) detectors 1622 and 1624. For a sawtooth to be detected it must have a minimum horizontal duration of two pixels. The number of sawtooth instances having more than the minimum two pixel duration during the time period of each horizontal line are accumulated in respective H rate sawtooth instant accumulators 1626 and 1628. The number of instances for the F0 and F2 signals are applied to two parallel paths, 1630 and 1632, representing the currently displayed field and the alternate field, respectively. The determination of which is F0 and which is F2 depends on the state of the F0/F2 switch in the system (as determined by the NTSC or PAL film detector). The F0/F2 signal from the NTSC or PAL film detectors controls a double-pole, double-throw switch 1629 which reverses the F0$s_{aw}$ and F2$_{saw}$ signal inputs depending on the polarity of the F0/F2 signal.

In the currently displayed path 1630, the number of sawtooths on the currently displayed field is divided by the number of moving edges in a divider 1634. If the quotient is greater than the sawtooth moving edge ratio as determined by a threshold 1636, then a counter 1638 is incremented. If the next line does not meet the same criteria, the counter 1638 is reset. Once the counter reaches the current field sawtooth V min threshold set by a threshold 1640, an edit is detected.

There are certain cases when the currently displayed edit detector path 1630 fails. This is when the motion detection occurs between fields of different scenes, causing most of the field to appear to be in motion. This greatly raises the number of horizontal transitions that are seen to be moving, which has the effect of lowering the horizontal transitions to sawtooths ratio and keeping an edit from being detected. This is a problem principally when the two fields that are interleaved come from the same information—generally the post edit information (see example below). The alternate field edit detector in path 1632 addresses this problem.

The alternate field edit detector portion of the sawtooth based edit detector takes as its input the number of detected sawtooths from the non-currently-displayed field. The number should generally be large if the field is in motion. The signal passes through a switch 1642 controlled by the occurrence of any sawtooths in the currently displayed field. If there are none, then the switch outputs 0, otherwise it outputs the number of sawtooths detected. This number is then compared with the number of moving edges in comparator 1644. If it is equal to or greater than the number of moving edges, the counter 1646 is incremented. If the next line does not meet the same criteria then the counter is reset. Once the counter 1646 reaches the Alternate field sawtooth V Min threshold set by a threshold 1648, an edit is detected. The outputs of the two processing branches are applied to an OR gate 950 so that whichever branch detects an edit, that output is applied to a final switch 1652 which ensures that the edit detector only detects edits on film material.

In order to better understand the operation of the sawtooth based edit detector, consider the following example. A film stream with an edit might look like AAABB122233, where the letters represent pre-edit information and the numbers represent post-edit material. Assume that the film detector interleaves 1 and 2 and there is motion between these fields. Therefore, sawtooths are visible (assume five sawtooths per line). This will also imply that there are five moving edges per line. The frame motion path subtracts B-2, so all of the field is seen as moving. Now every edge in field 1 is seen as moving. If there are twenty edges, all twenty are seen as moving. The ratio of sawtooths versus moving edges in no longer 5/5, but 5/20, which lies below the threshold, so no edit is detected. The alternate field path now is detecting sawtooths between B and 1. This will be a number generally greater than or equal to the actual number of transitions in field 1. (Note: this is the case for moving film as well). For our example, assume thirty sawtooths were detected per line.

Thirty sawtooths is greater than twenty moving edges and there are five sawtooths on the currently displayed field, so an edit is detected. For standard film there would be no sawtooths on the currently displayed field, so no edit would be detected. Because computer generated single line material can meet these requirements, a vertical minimum threshold has been imposed.

The sawtooth based edit detector has nine adjustable parameters: an H edge threshold, a motion threshold, a sawtooth moving edge ratio, a current field sawtooth V min threshold, an alternate field sawtooth V min threshold and four edit blanking parameters chat define the area of edit detection: edit blanking top line, edit blanking bottom line, edit blanking right side, edit blanking left side.

I claim:

1. A method of generating a field motion signal, comprising:
    generating a field-to-field motion value;
    generating an intra-field vertical picture transition value; and
    generating the field motion signal by comparing the field-to-field motion value and the intra-field vertical picture transition value wherein the field motion signal indicates no field-to-field motion when the intra-field vertical picture transition value is greater than the field-to-field motion value.

2. A method as recited in claim 1, wherein the field motion signal indicates field-to-field motion when the intra-field vertical picture transition value is less than the field-to-field motion value.

3. A method as recited in claim 1, wherein the generating the field-to-field motion value comprises:
    comparing temporally adjacent pixel information of opposing field parity.

4. A method as recited in claim 1, wherein the generating the intra-field vertical picture transition value comprises:
    comparing spatially adjacent pixel information within a single field.

5. A method as recited in claim 1, further comprising:
    receiving an interlaced video signal (F0);
    providing a first delayed output signal (F1−1/2H) by delaying the video signal by one field period less one half of one scanning line period;
    providing a second delayed output signal (F1+1/2H) by delaying the video signal by one field period plus one half of one scanning line period;
    providing a first difference value by subtracting the first delayed output from the video signal; and
    providing a second difference value by subtracting the second delayed output from the video signal.

6. A method as recited in claim 5, wherein the generating a field-to-field motion value comprises:
    absolute value comparing of the first difference value and the second difference value; and
    selecting the smallest absolute value as the field-to-field motion value.

7. A field motion detector for detecting true motion between interlaced video fields, comprising:
    a field-to-field motion value generator arranged to generate a field-to-field motion value indicative of motion between video fields of opposing parity;
    an intra-field vertical picture transition value generator arranged to generate an intra-field motion value indicative of motion within a single field;
    a comparator coupled to the field-to-field motion value generator and the intra-field vertical picture transition value generator arranged to compare the field-to-field motion value and the intra-field vertical picture transition value; and a field motion signal generator arranged to generate a field motion signal indicative of true inter-field motion based upon the comparison of the field-to-field motion value and the intra-field vertical picture transition.

8. A field motion detector as recited in claim 7, wherein when the intra-field vertical picture transition value is greater than the field-to-field motion value, the corresponding field motion signal indicates no field-to-field motion.

9. A field motion detector as recited in claim 7, wherein when the intra-field vertical picture transition value is less than the field-to-field motion value, the corresponding field motion signal indicates true field-to-field motion.

10. A detector as recited in claim 7, wherein the field-to-field motion value generator further comprises:

a comparator arranged to compare pixel information of temporally adjacent pixels of opposing field parity.

11. A detector as recited in claim 7, wherein the generating the intra-field vertical picture transition value generator further comprises:

a comparator arranged to compare pixel information of spatially adjacent pixels within a single field.

12. An apparatus for providing a field motion signal, comprising:

means for generating a field-to-field motion value;

means for generating an intra-field vertical picture transition value; and means for generating the field motion signal by comparing the field-to-field motion value and the intra-field vertical picture transition value wherein the field motion signal indicates no field-to-field motion when the intra-field vertical picture transition value is greater than the field-to-field motion value.

* * * * *